(12) United States Patent
Penn

(10) Patent No.: US 8,754,004 B2
(45) Date of Patent: Jun. 17, 2014

(54) REMOVING PHOSPHORUS FROM SURFACE AND DRAINAGE WATERS THROUGH USE OF INDUSTRIAL BY-PRODUCTS

(75) Inventor: Chad J. Penn, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 187 days.

(21) Appl. No.: 13/447,956

(22) Filed: Apr. 16, 2012

(65) Prior Publication Data

US 2012/0264591 A1 Oct. 18, 2012

Related U.S. Application Data

(60) Provisional application No. 61/476,147, filed on Apr. 15, 2011.

(51) Int. Cl.
*B01J 20/34* (2006.01)
(52) U.S. Cl.
USPC ............. 502/439; 502/22; 502/400; 502/516
(58) Field of Classification Search
CPC ............. B01J 20/34; B01J 20/30; B01J 20/00
See application file for complete search history.

(56) References Cited

U.S. PATENT DOCUMENTS

| | | | |
|---|---|---|---|
| 2,133,571 A | 10/1938 | Rochling et al. | |
| 2,792,299 A | 5/1957 | Halversen | |
| 2,822,240 A | 2/1958 | Dunn et al. | |
| 3,676,104 A | 7/1972 | Kihlstedt | |
| 4,136,199 A | 1/1979 | Mills | |
| 4,537,756 A | 8/1985 | Rottgen et al. | |
| 5,502,268 A | 3/1996 | Cote et al. | |
| 5,876,606 A | 3/1999 | Blowes et al. | |
| 5,888,404 A | 3/1999 | Jokinen | |
| 6,214,229 B1 | 4/2001 | Robertson | |
| 6,602,421 B2 | 8/2003 | Smith | |
| 6,645,366 B2 | 11/2003 | Iseki et al. | |
| 6,858,142 B2 | 2/2005 | Towndrow | |
| 7,754,169 B2 | 7/2010 | Constantz et al. | |
| 2004/0136899 A1 | 7/2004 | Bekker et al. | |
| 2005/0173033 A1 | 8/2005 | Yazawa et al. | |
| 2006/0036124 A1 | 2/2006 | Forrester | |
| 2008/0078720 A1 | 4/2008 | Drizo et al. | |

OTHER PUBLICATIONS

Wiedeman, A. et al., "Chesapeake Bay Program Nutrient Trading Fundamental Principles and Guidelines", Mar. 1, 2001, Publisher: Chesapeake Bay Program.

Toride, N. et al., "The CXTFIT Code for Estimating Transport Parameters from Laboratory or Field Tracer Experiments Version 2.1", U.S. Salinity Laboratory Agricultural Research Service Research Report No. 137, Apr. 1, 1999, Publisher: U.S. Department of Agriculture.
Desutter, T.M. et al., "Flow-Through and Batch Methods for Determining Calcium—Magnesium and Magnesium—Calcium Selectivity", Soil Science Society of American Journal, Feb. 27, 2006, pp. 550-554, vol. 70, Publisher: Soil Science Society of America.
Drizo, A. et al., "New Evidence for Rejuvenation of Phosphorus Retention Capacity in EAF Steel Slag", Environmental Science Technology, Jan. 29, 2008, pp. 6191-6197, vol. 42, Publisher: American Chemical Society.
United State Environmental Protection Agency, "Quality Criteria for Water 1986", May 1, 1986, Publisher: United States Environmental Protection Agency.
Grubb, K.L. et al., "Land application of spent gypsum from ditch filters: phosphorus source or sink?", Agricultural Sciences, May 26, 2011, pp. 364-374, vol. 2, No. 3, Publisher: SciRes.
Grubb, K.L. et al., "Effect of Land Application of Phosphorus-Saturated Gypsum on Soil Phosphorus in a Laboratory Incubation", Applied and Environmental Soil Science, Jul. 6, 2011, vol. 2012, Publisher: Hindawi Publishing Corporation.
Johansson, L., "Industrial By-Products and Natural Substrata as Phosphorus Sorbents", Environmental Technoloogy, May 11, 2010, pp. 309-316, vol. 20, No. 3, Publisher: Selper, Ltd.
Klute, A. et al., "Hydraulic Conductivity and Diffusivity; Laboratory Methods", Methods of Soil Analysis Part 1—Physical and Mineralogical Methods, 1986, pp. 687-734, vol. SSA Book Series 5, Publisher: American Society of Agronomy, Inc.
McBride, M.B., "Chemisorption and Precipitation of Inorganic Ions", Environmental Chemistry of Soils, 1994, pp. 121-168, Publisher: Oxford University Press.
McGrath, J.M. et al., "A modelling approach to the design of in situ agricultural drainage filters", Soil Use and Management, 2012.
Penn, C.J. et al., "Trapping Phosphorus in Runoff with a Phosphorus Removal Structure", Journal of Environmental Quality, Feb. 14, 2011.
Sims, J.T. et al., "Nutrient Mass Balances for the State of Delaware 1996 to 2006 Final Project Report", Mar. 12, 2008, Publisher: University of Delaware.
Stoner, D. et al., "Phosphorus Removal with By-Products in a Flow-Through Setting", Journal of Environmental Quality, Feb. 15, 2011.

(Continued)

*Primary Examiner* — Edward Johnson
(74) *Attorney, Agent, or Firm* — Fellers, Snider, Blankenship, Bailey & Tippens, P.C.; Terry L. Watt

(57) ABSTRACT

A method of constructing a phosphorous adsorbing structure includes creating a design model that indicates a percentage of phosphorous removed from a water supply per an amount of a predetermined adsorbent exposed to the water supply based upon an original concentration of phosphorous in the water supply and a retention time of water in the adsorbing structure.

14 Claims, 13 Drawing Sheets

(56) References Cited

OTHER PUBLICATIONS

Agrawal, Sheela G. et al., "Use of Industrial Byproducts to Filter Phosphorus and Pesticides in Golf Green Drainage Water (Abstract Only)", Journal of Environmental Quality, Jul 1, 2011, pp. 1273-1280, vol. 40, No. 4.

Bird, S.C. et al., "Investigations on phosphorus recovery and reuse as soil amendment from electric arc furnace slag filters (Abstract Only)", Journal of Environmental Science and Health, 2009, pp. 1476-1483, vol. 44, No. 13.

Bolster, C. et al., "On the use of Linearized Langmuir Equations (Abstract Only)", Soil Science Society of America Journal, Nov. 1, 2007, pp. 1796-1806, vol. 71, No. 6.

Bowden, L. et al., "Phosphorus removal from waste waters using basic oxygen steel slag (Abstract Only)", Environ. Sci. Technol., Apr. 1, 2009, pp. 2476-2481, vol. 1, No. 43(7).

Brennan, R.B. et al., "Evaluation of chemical amendments to control phosphorus losses from dairy slurry", Soil Use and Management, 2011, pp. 238-246, vol. 27, No. 2.

Cao, X. et al., "Carbonate and Magnesium Interactive Effect on Calcium Phosphate Precipitation", Environmental Science and Technology, Dec. 14, 2007, pp. 436-442, vol. 42, No. 2, Publisher: American Chemical Society.

Carpenter, S.R., "Phosphorus control is critical to mitigating eutrophication", Proc. Natl. Acad. Sci., Aug. 12, 2008, pp. 11039-11040, vol. 105, No. 32.

Penn, C.J. et al., "Removing dissolved phosphorus from drainage ditch water with phosphorus sorbing materials", Journal of Soil and Water Conservation, 2007, pp. 269-276, vol. 62, No. 4, Publisher: Soil and Water Conservation Society.

Cucarella, V. et al., "Phosphorus Sorption Capacity of Filter Materials Used for On-site Wastewater Treatment Determined in Batch Experiments—A Comparative Study" (Abstract Only), Journal of Environmental Quality, Mar. 1, 2009, vol. 38, No. 2.

Daly, Karen et al., "Modeling Phosphorus Concentrations in Irish Rivers Using Land Use, Soil Type, and Soil Phosphorus Data (Abstract Only)", Journal of Environmental Quality, Mar. 1, 2002, pp. 590-599, vol. 31, No. 2.

Dobbie, K.E. et al., "Evaluation of iron ochre from mine drainage treatment for removal of phosphorus from wastewater", Chemosphere, Feb. 4, 2009, pp. 795-800, vol. 75, Publisher: Elsevier, Ltd.

Drizo, A. et al., "Physico-chemical screening of phosphate-removing substrates for use in constructed wetland systems (Abstract Only)", Water Research, Dec. 1, 1999, pp. 3595-3602, vol. 33, No. 17, Publisher: Elsevier.

Drizo, A. et al., "Phosphorus Saturation Potential: A Parameter for Estimating the Longevity of Constructed Wetland Systems", Environ. Sci. Technol., 2002, pp. 4642-4648, vol. 36, Publisher: American Chemical Society.

Drizo, A. et al., "Phosphorus removal by electric arc furnace steel slag and serpentinite", Water Research, May 1, 2006, pp. 1547-1554, vol. 40, No. 8, Publisher: Elsevier.

Drizo, A. et al., "New evidence for rejuvenation of phosphorus retention capacity in EAF steel slag (Abstract Only)", Environ. Sci. Technol., Aug. 15, 2008, pp. 6191-6197, vol. 42, No. 16.

Edwards, D.R. et al., "Effects of Poultry Litter Application Rate and Rainfall Intensity on Quality of Runoff from Fescuegrass Plots (Abstract Only)", Journal of Environmental Quality, 1993, pp. 361-365, vol. 22, No. 2.

Eghball, B. et al., "Reduction of High Soil Test Phosphorus by Corn and Soybean Varieties", Agronomy—Faculty Publications Paper 334, Jan. 1, 2003, Publisher: University of Nebraska Agronomy and Horticulture Department.

Elliott, H.A. et al., "Runoff Phosphorus Losses from Surface-Applied Biosolids" (Abstract Only), Journal of Environmental Quality, 2005.

EPA, "Microwave Assisted Acid Digestion of Sediments, Sludges, Soils and Oils", EPA Method 3051A, Feb. 1, 2007, Publisher: U.S. Environmental Protection Agency.

Fenton, O. et al., "Use of Ochre from an Abandoned Metal Mine on the South East of Ireland for Phosphorus Sequestration from Dairy Dirty Water", Journal of Environmental Quality, 2009, pp. 1120-1125, vol. 38, No. 3.

Fuchs, J.W., "Subsurface Transport of Phosphorus in Riparian Floodplains: Tracer and Phosphorus Transport Experiments", Journal of Environmental Quality, 2009, pp. 473-484, vol. 38.

Gallimore, L.E. et al., "Water Treatment Residual to Reduce Nutrients in Surface Runoff from Agricultural Land (Abstract Only)", Journal of Environmental Quality, Sep. 1, 1999, pp. 1474-1478, vol. 28, No. 5.

Harmel, R.D. et al., "Water Quality Impacts of Converting to a Poultry Litter Fertilization Strategy", Journal of Environmental Quality, 2004, pp. 2229-2242, vol. 32.

Heal, K.V. et al., "Enhancing phosphorus removal in constructed wetlands with ochre from mine drainage treatment", Water Science & Technology, 2005, pp. 275-282, vol. 51, No. 9, Publisher: IWA Publishing.

Hedin, R.S. et al., "Passive Treatment of Acid Mine Drainage with Limestone (Abstract Only)", Journal of Environmental Quality, Nov. 1, 1994, pp. 1338-1345, vol. 23, No. 6.

Ippolito, J.A. et al., "Drinking water treatment residuals: a review of recent uses" (Abstract Only), Journal of Environmental Quality, Jan. 1, 2011, pp. 1-12, vol. 40, No. 1.

King, K.W. et al., "Nutrient Load Generated by Storm Event Runoff from a Golf Course Watershed (Abstract Only)", Journal of Environmental Quality, Jul. 1, 2007, pp. 1021-1030, vol. 36, No. 4.

Kleinman, P.J.A. et al., "Measuring Water-Extractable Phosphorus in Manure as an Indicator of Phosphorus in Runoff", Soil Sci. Soc. Am. J., 2002, pp. 2009-2015, vol. 66.

Kleinman, P.J.A. et al., "Dynamics of phosphorus transfers from heavily manured Coastal Plain soils to drainage ditches", Journal of Soil and Water Conservation, Jul. 1, 2007, pp. 225-235, vol. 62, No. 4.

Koiv, M. et al., "Phosphorus removal using Ca-rich hydrated oil shale ash as filter material—The effect of different phosphorus loadings and wastewater compositions" (Abstract Only), Water Research, Oct. 1, 2010, pp. 5232-5239, vol. 44, No. 18, Publisher: Elsevier.

Kostura, B. et al., "Blast furnace slags as sorbents of phosphate from water solutions (Abstract Only)", Water Res., May 1, 2005, pp. 1795-1802, vol. 39, No. 9.

Leader, J.W. et al., "Phosphorus Sorbing Materials: Sorption Dynamics and Physicochemical Characteristics", Journal of Environmental Quality, 2008, pp. 174-181, vol. 37.

Lee, J. et al., "The Feasibility of Shallow Time Domain Reflectometry Probes to Describe Solute Transport Through Undisturbed Soil Cores", Soil Science Society of America Journal, 2002, pp. 53-57, vol. 66.

Lee, M.S. et al., "Evaluating the efficiency and temporal variation of pilot-scale constructed wetlands and steel slag phosphorus removing filters for treating dairy wastewater" (Abstract Only), Water Research, Jul. 1, 2010, pp. 4077-4086, vol. 44, No. 14, Publisher: Elsevier.

Makris, K.C. et al., "Time dependency and irreversibility of water desorption by drinking-water treatment residuals: Implications for sorption mechanisms" (Abstract Only), Journal of Colloid and Interface Science, Feb. 1, 2006, pp. 151-154, vol. 294, No. 1, Publisher: Elsevier.

McDowell, R.W. et al., "Treatment of drainage water with industrial by-products to prevent phosphorus loss from tile-drained land" (Abstract Only), Journal of Environmental Quality, Jun. 23, 2008, pp. 1575-1582, vol. 37, No. 4.

McGrath, J.M. et al., "A modeling approach to the design of in situ agricultural drainage filters", Soil Use and Management, 2012, Publisher: British Society of Soil Science.

McKeague, J.A. et al., "Dithionite- and Oxalate-Extractable Fe and Al as Aids in Differentiating Various Classes of Soils", Canadian Journal of Soil Science, 1966, pp. 13-22, vol. 46.

Murphy, J. et al., "A modified single solution method for the determination of phosphate in natural waters", Anal. Chim. Acta., 1962, pp. 31-36, vol. 27.

(56) References Cited

OTHER PUBLICATIONS

National Slag Association, "A Guide for the use of Steel Slag in Agriculture and for Reclamation of Acidic Lands", 2010, Publisher: National Slag Association.

Penn, C.J. et al., "Application of phosphorus sorbing materials to streamside cattle loafing areas (Abstract Only)", Journal of Soil and Water Conservation, Sep. 1, 2006, pp. 303-310, vol. 61, No. 5, Publisher: The Soil and Water Conservation Society.

Penn, C.J. et al., "Surface runoff losses of phosphorus from Virginia soils amended with turkey manure using phytase and high available phosphorus corn diets" (Absract Only), Journal of Environmental Quality, Jul. 1, 2004, pp. 1431-1439, vol. 33, No. 4.

Penn, Chad et al., "Sequestering Dissolved Phosphorus from Ditch Drainage Water (Abstract Only)", Journal of Soil and Water Conservation, Jul. 1, 2007.

Penn, Chad et al., "Ditch Drainage Management for Water Quality Improvement: Ditch Drainage Treatment Structures (Abstract Only)", Research Signpost, Jan. 21, 2010, pp. 151-172.

Penn, Chad et al., "Use of industrial by-products to sorb and retain phosphorus (Abstract Only)", Communications in Soil Science and Plant Analysis, Mar. 21, 2011, pp. 633-644, vol. 42.

Penn, Chad J. et al., "Trapping Phosphorus in Runoff with a Phosphorus Removal Structure", Journal of Environmental Quality, 2011.

Penn, C.J. et al., "Maximizing ammonium nitrogen removal from solution using different zeolites" (Abstract Only), Journal of Environmental Quality, Jul. 1, 2010, pp. 1478-1485, vol. 39, No. 4.

Penn, C.J. et al., "Predicting Phospphorus Sorption onto Steel Slag Using a Flow-through Approach with Application to a Pilot Scale System", Journal of Water Resource and Protection, Apr. 1, 2011, pp. 235-244, vol. 3, Publisher: Scientific Research.

Pionke, H.B. et al., "Hydrological and chemical controls on phosphorus loss from catchments (Abstract Only)", Phosphorus loss from soil to water: Proceedings of a workshop, Sep. 29, 1995, pp. 225-242, vol. 1997.

Pionke, H.B. et al., "Seasonal flow, nutrient concentrations and loading patterns in stream flow draining an agricultural hill-land watershed", Journal of Hydrology, 1999, vol. 220, No. 62-73, Publisher: Elsevier.

Proctor, D.M. et al., "Physical and chemical characteristics of blast furnace, basic oxygen furnace, and electric arc furnace steel industry slags" (Abstract Only), Environmental Science & Technology, 2000, pp. 1576-1582, vol. 34, No. 8.

Quinton, J.N. et al., "The selective removal of phosphorus from soil: is event size important? (Abstract Only)", Journal of Environmental Quality, Mar. 1, 2001, pp. 538-545, vol. 30, No. 2.

Rhoton, F.E. et al., "Phosphate Adsorption by Ferrihydrite-Amended Soils", Journal of Environmental Quality, 2005, pp. 890-896, vol. 34.

Schindler, D.W., "Eutrophication and Recovery in Experimental Lakes: Implacations for Lake Management", Science, May 24, 1974, pp. 897-899, vol. 184, No. 4139, Publisher: American Association for the Advancement of Science.

Schulte, R.P.O. et al., "Modeling soil phosphorus decline: Expectations of Water Framework Directive policies (Asbtract Only)", Environmental Science & Policy, 2010, pp. 472-484, vol. 13, No. 6.

Sharpley, A.N. et al., "The Transport of Bioavailable Phosphorus in Agricultural Runoff", Journal of Environmental Quality, Jan. 1, 1992, pp. 30-35, vol. 21.

Sharpley, A.N. et al., "Modeling phosphorus transport in agricultural watersheds: Process and possibilities", Journal of Soil and Water Conservation, 2002, pp. 425-439, vol. 57, No. 6, Publisher: Soil and Water Conservation Society.

Sharpley, A.N. et al., "Integrating Contributing Areas and Indexing Phosphorus Loss from Agricultural Watersheds (Abstract Only)", Journal of Environmental Quality, Jul. 1, 2008, pp. 1488-1496, vol. 37, No. 4.

Shilton, A.N. et al., "Phosphorus removal by an 'active' slag filter—a decade of full scale experience (Abstract Only)", Water Res., Jan. 1, 2006, pp. 113-118, vol. 40, No. 1.

Sibrell, P.L. et al., "Removal of phosphorus from agricultural wastewaters using adsorption media prepared from acid mine drainage sludge" (Asbstract Only), Water Res., May 1, 2009, pp. 2240-2250, vol. 43, No. 8.

Sims, J.T. et al., "Phosphorus Loss in Agricultural Drainage: Historical Perspective and Current Research" (Abstract Only), Journal of Environmental Quality, Mar. 1, 1998, pp. 277-293, vol. 27, No. 2.

Sims, J.T. et al., "Evaluation of Mehlich 3 as an Agri-Environmental Soil Phosphorus Test for the Mid-Atlantic United States of America" (Abstract Only), Soil Science Society of America Journal, Nov. 1, 2002, pp. 2016-2032, vol. 66, No. 6.

Sims, J.T. et al., "Managing agricultural phosphorus for environmental protection (Abstract Only)", Phosphorus: agriculture and the environment, 2005, pp. 1021-1068, vol. 46.

Sonzogni, W.C. et al., "Bioavailability of Phosphorus Inputs to Lakes (Abstract Only)", Journal of Environmental Quality, 1982, pp. 555-563, vol. 11, No. 4.

Udawatta, R.P. et al., "Phosphorus Loss and Runoff Characteristics in Three Adjacent Agricultural Watersheds with Claypan Soils (Abstract Only)", Journal of Environment Quality, Sep. 1, 2004, pp. 1709-1719, vol. 33, No. 5.

Vadas, P.A. et al., "Relating soil phosphorus to dissolved phosphorus in runoff: a single extraction coefficient for water quality modeling" (Abstract Only), Journal of Environmental Quality, Mar. 1, 2005, pp. 572-580, vol. 34, No. 2.

Vadas, P.A. et al., "Transformations of soil and manure phosphorus after surface application of manure to field plots", Nutr. Cycl. Agroecosyst., 2007, pp. 83-99, vol. 77, Publisher: Springer.

Vadas, P.A. et al., "Hydrology and groundwater nutrient concentrations in a ditch-drained agroecosystem", Journal of Soil and Water Conservation, Jul. 1, 2007, pp. 178-188, vol. 62, No. 4.

Weber, D. et al., "Upgrading constructed wetlands phosphorus reduction from a diary effluent using electric arc furnace steel slag filters" (Abstract Only), Water Sci Technology, 2007, pp. 135-143, vol. 56, No. 3.

Wei, X. et al., "Phosphorus removal by acid mine drainage sludge from secondary effluents of municipal wastewater treatment plants" (Abstract Only), Water Research, Jul. 1, 2008, pp. 3275-3284, vol. 42, No. 13, Publisher: Elsevier.

Westholm, L.J., "Substrates for phosphorus removal—Potential benefits for on-site wastewater treatment? (Abstract Only)", Water Research, Jan. 1, 2006, pp. 23-36, vol. 40, No. 1, Publisher: Elsevier.

Diloria, F.C., "SAS Applications Programming: A Gentle Introduction. Chapter 24: Analysis of Variance", 1991, Publisher: Duxbury Press.

Lindsay, W.L., "Chemical Equilibria in Soils: Chapter 12 Phosphates", 1979, Publisher: John Wiley & Sons, Inc.

Stoner, D. et al., "Phosphorus Removal with By-Products in a Flow-Through Setting", 2012, Journal of Environmental Quality vol. 41. p. 654-663.

REMOVING PHOSPHORUS FROM SURFACE AND DRAINAGE WATERS THROUGH USE OF INDUSTRIAL BY-PRODUCTS

STATEMENT REGARDING FEDERALLY SPONSORED RESEARCH OR DEVELOPMENT

This invention was made with U.S. Government support under USDA/NRCS Grant No. NRCS 69-3A75-7-116 awarded by the Department of Agriculture. The Government has certain rights in this invention.

CROSS REFERENCE TO RELATED APPLICATIONS

This application claims the priority of U.S. Provisional Patent Application No. 61/476,147 entitled "Removing Phosphorus From Surface and Drainage Waters Through Use of Industrial By-Products," filed Apr. 15, 2011, the contents of which are hereby incorporated by reference.

BACKGROUND OF THE INVENTION

Excessive phosphorus (P) in surface waters causes eutrophication thereby resulting in excessive plant growth, fish kills, poor drinking water quality, and overall decrease in environmental quality/recreation. Potential sources of phosphorus to surface waters include waste-water treatment plants, horticultural operations, and runoff from agricultural and urban/suburban land, including golf courses.

Soils become saturated with phosphorus through continuous over application of phosphorus to growing plants. The soils with high levels of phosphorus then slowly release dissolved phosphorus in runoff. There are currently no effective best management practices (BMPs) for reducing transport of dissolved phosphorus. Most BMPs only prevent erosion, which will only reduce particulate phosphorus transport, not dissolved phosphorus. Even if all phosphorus applications to high phosphorus soils are stopped, it will require at least 15 years for soil phosphorus concentrations to decrease to acceptable levels if plants are harvested from the site. In the meantime, these soils will release dissolved phosphorus during every runoff event. Dissolved phosphorus presents a greater and more immediate problem compared to particulate phosphorus (i.e. phosphorus adsorbed onto soil particles) because dissolved phosphorus is 100% bio-available to aquatic organisms. In regard to runoff, dissolved phosphorus is a difficult form to control since particulate losses are typically controlled by maintaining sufficient soil cover and reducing erosion. Dissolved phosphorus loads in runoff are greatest from soils that are high in soil test phosphorus and soils with recent surface applications of phosphorus.

A possible solution to the problem of excess phosphorous is the application of phosphorus sorbing materials to affected soils. Such materials can be applied directly to the soil or included with applied animal manures. These techniques have been shown to reduce dissolved phosphorus transport in runoff during rainfall events. However, phosphorus sorbed onto these materials may become soluble again with time, or due to changes in chemical conditions. Therefore, phosphorus is not truly removed from the system, only temporarily made insoluble.

Another potential solution is direct application of phosphorus sorbing materials to surface waters (lakes, ponds, etc.). This has been shown to be effective for reducing soluble phosphorus concentrations in the water column of various lakes. However, this approach only reduces the solubility of phosphorus in the system; phosphorus is not actually removed from the water. The sorbed phosphorus can be re-dissolved with time, or upon changes in chemical conditions.

What is needed is a system and method for addressing the above, and related, issues.

SUMMARY OF THE INVENTION

The invention of the present disclosure, in one aspect thereof, comprises a method of constructing a phosphorous removal structure. The method includes creating a design model that indicates a percentage of phosphorous removed from a water supply per an amount of a predetermined adsorbent exposed to the water supply based upon an original concentration of phosphorous in the water supply and a retention time of water in the adsorbing structure. The method further includes selecting a percentage value from the design model for a target amount of phosphorous to be removed from the water supply, and constructing a cell containing an amount of the predetermined adsorbent as required by the design model and having the required retention time.

In some embodiments, the design model is based upon a plurality of experimentally derived data points indicating percentages of phosphorous removed per quantity of exposed adsorbent at a plurality of retention times and original phosphorous concentrations. For example, the design model may be based upon a function of phosphorous adsorbed by the adsorbent governed by the equation $P=be^{mx}$, where P is discrete phosphorous adsorbed (%), x is the phosphorous added to the adsorbent, b is the Y-intercept and m is the slope.

The method may also include determining a total amount of phosphorous removed by the structure using the relationship $$\text{Cumulative } P \text{ removed } (\%) = \frac{\int_0^x (be^{-mx})\, dx}{x}.$$

The method can include determining a maximum phosphorous adsorbed by the structure using the relationship $$\text{Maximum } P \text{ added} = \frac{\ln b}{-m}.$$

The variables m and b may be determined experimentally from linear regression of the plurality of experimentally derived data points.

The method may be applicable to a Ca based adsorbent with the design model based upon the equation $P=be^{mx}$, with P being discrete phosphorous removed, and x being phosphorous added to the adsorbent. In such case m is determined based on the equation: $\log(-m)=(\alpha RT)+(\beta P)+\chi$, and b is determined based on the equation: $\log(b)=(\delta RT)+(\epsilon P)+\mu$. Here $\alpha=0.009113*PS$; $\beta=-(0.00000021*\text{Total Ca})+(0.02209*BI)\pm(0.01536*PS)-0.04258$; $\chi=-0.3795*LN(BI)-3.946$; $\delta=(-0.00806*\mu)+(0.00775*PS)+0.02133$; $\epsilon=$ the lesser of zero and $(0.0191*pH)-0.1678$; and $\mu=(0.79079*BI)+1.51358$; with PS=byproduct mean particle size, BI=acid equivalent to decrease pH to about 6.0.

The method may also be applicable to an Fe/Al based adsorbent with the design model is based upon the equation $P=be^{mx}$, with P being discrete phosphorous removed, and x being phosphorous added to the adsorbent. In such case m is determined based on the equation: $\log(-m)=(\alpha RT)+(\beta P)+\chi$, and b is determined based on the equation: $\log(b)=(\delta RT)+(\epsilon P)+\mu$. Here $\alpha=(-0.000000733259*Feox+Alox)+(0.00825*PS)+0.03981$; $\beta=(0.00000073793*Feox+Alox)-0.04844$; $\chi=(-0.00002078*Feox+Alox)-3.00342$; $\delta=(-0.000000974652*Feox+Alox)+0.06874$; $\epsilon=(0.000000564354*Feox+Alox)-0.0269$; $\mu=(0.0000005159108*\text{Effective Al+Fe})+1.30197$; and Effective Al+Fe is Total Al+Fe divided by PS. PS=byproduct mean particle size, Feox=oxalate extractable Fe of the byproduct, and Alox=oxalate extractable Al of the byproduct.

In various embodiments of the method, the adsorbent may be an industrial byproduct such as steel slag.

The invention of the present disclosure, in another aspect thereof, comprises a device for determining a design model for a phosphorous adsorbing system. The system includes a processor that executes computer instructions, and a memory containing computer instructions executed by the processor. The instructions include accepting data from a user corresponding to an industrial by product, the data including whether for an industrial by product, total Ca exceeds total Al and Fe, whether the pH of the byproduct exceeds 8, and whether a buffer index (BI) defined as an acid equivalent required to lower the pH of the byproduct to 6 is greater than 0.2 equivalents per unit weight (e.g., gram), and mean particle size of the byproduct. The instructions also include determining whether the byproduct is Ca based by determining whether at least two of the following are true: total Ca exceeds total Al+Fe, pH>8, and BI>0.2. The instructions specify that If the byproduct is Ca based, preparing a design curve according to the equation $P=be^{mx}$, with P being discrete phosphorous removed, and x being phosphorous added to the adsorbent where: m is determined based on the equation: $\log(-m)=(\alpha RT)+(\beta P)+\chi$; b is determined based on the equation: $\log(b)=(\delta RT)+(\epsilon P)+\mu$; $\alpha=0.009113*PS$; $\beta=-(0.00000021*\text{Total Ca})+(0.02209*BI)\pm(0.01536*PS)-0.04258$; $\chi=-0.3795*LN(BI)-3.946$; $\delta=(-0.00806*\mu)+(0.00775*PS)+0.02133$; $\epsilon=$the lesser of zero and $(0.0191*pH)-0.1678$; and $\mu=(0.79079*BI)+1.51358$. When the byproduct is Al and Fe based, the instructions include accepting from the user an oxalate extractable Fe of the byproduct and an oxalate extractable Al of the byproduct, and preparing a design curve according to the equation $P=be^{mx}$, with P being discrete phosphorous removed, and x being phosphorous added to the adsorbent where: $\alpha=(-0.000000733259*Feox+Alox)+(0.00825*PS)+0.03981$; $\beta=(0.00000073793*Feox+Alox)-0.04844$; $\chi=(-0.00002078*Feox+Alox)-3.00342$; $\epsilon=(-0.000000974652*Feox+Alox)+0.06874$; $\epsilon=(0.000000564354*Feox+Alox)-0.0269$; $\mu=(0.0000005159108*\text{Effective Al+Fe})+1.30197$; and Effective Al+Fe is Total Al+Fe divided by PS. Here Feox=the oxalate extractable Fe of the byproduct, and Alox=the oxalate extractable Al of the byproduct.

In some embodiments instructions are included for determining the total cumulative phosphorus adsorbed under the design model according to the following integral:

$$\text{Cumulative } P \text{ removed} = \frac{\int_0^x (be^{mx})dx}{x}.$$

Instructions may also be included for determining the maximum phosphorous that may be adsorbed according to the relationship:

$$\text{Maximum } P \text{ added} = \frac{\ln b}{-m}.$$

The invention of the present disclosure, in another aspect thereof, comprises a method of rejuvenating a contaminant phosphorous adsorber. The method includes retaining the contaminant phosphorous adsorber in a cell, and precipitating amorphous Al hydroxide minerals on the surface of the phosphorous adsorber. In some embodiments, the phosphorous adsorber is a slag material such as a steel slag or other industrial byproduct.

The method may also include plugging the cell to prevent draining prior to precipitating amorphous Al hydroxide minerals on the surface of the phosphorous adsorber, and leaving the Al hydroxide minerals on the surface of the phosphorous adsorber for about 48 hours. In some cases the Al hydroxide minerals comprise an aluminum sulfate solution ($Al_2[SO_4]_3 \cdot 12H_2O$).

DETAILED DESCRIPTION OF THE PREFERRED EMBODIMENTS

Figure 1A:
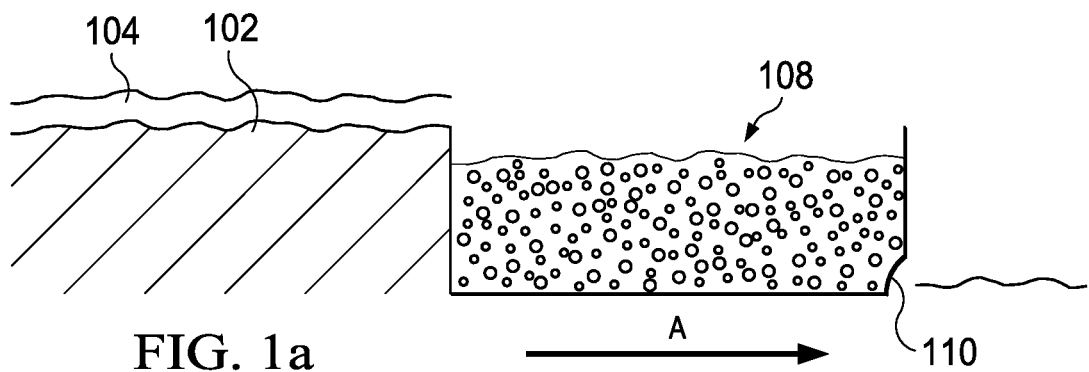
FIG. 1a is a side view cutaway diagram of a phosphorous removal system according to the present disclosure.

Phosphorus sorbing materials can be used in an isolated structure for treating phosphorus rich runoff prior to reaching surface bodies of water. Examples of phosphorus removal efforts include construction of a phosphorus removal structure in a surface water drainage ditch. Such a structure contains an iron rich by-product that possesses a high phosphorus sorption capacity. Testing with such a structure revealed that, in a single rainfall event that lasted nearly 18 h, the structure removed 99% of the dissolved phosphorus that entered it. One disadvantage of the iron rich by-product was that it had low hydraulic conductivity. Therefore the amount of water that can be treated with such a device can be limited depending on the material used. For example, a sieved steel slag can handle extremely high flow rates. If a material of low hydraulic conductivity is utilized, then a larger surface area and shallow depth is necessary in order to achieve the desired flow rate. The methods presented in the present disclosure are able to account for this and other factors.

A by-product from the steel industry that has potential for use in phosphorus removal structures is steel slag. Both Ca and Fe rich waste products can be utilized to treat wastewater streams. In addition, it has been found that a mixture of "basic" and "melter" slag backfilled around subsurface drainage pipes and overlaid by phosphorus rich topsoils can significantly reduce dissolved phosphorus concentrations in drainage waters. In another study, a melter slag was utilized as a filter material at a wastewater treatment plant for 11 years. It was found that 77% of total phosphorus was removed during the first 5 years of operation.

The phosphorus removal structures of the present disclosure, in one embodiment, are designed to force flowing water through sorption materials such as industrial byproducts. Clean water is allowed to exit the structure, which is designed to prevent the sorption material from being lost. Reference is now made to FIG. 1, which is aside cutaway diagram of an exemplary P removal system according to the present disclosure. In FIG. 1 the system 100 comprises a cell 106 placed at the outlet of a spillway 102 (or other landscape). Water (containing phosphorous contamination) flows into the cell 106, which contains a quantity of an industrial by product 108 that absorbs phosphorous (e.g., slag). An outlet 110 is provides that allows the water 104 to escape the cell 106, but which retains the byproduct 108. The cell 106 will be placed such that the water generally flows through the cell toward the outlet 110 as shown by arrow A.

Figure 2A:
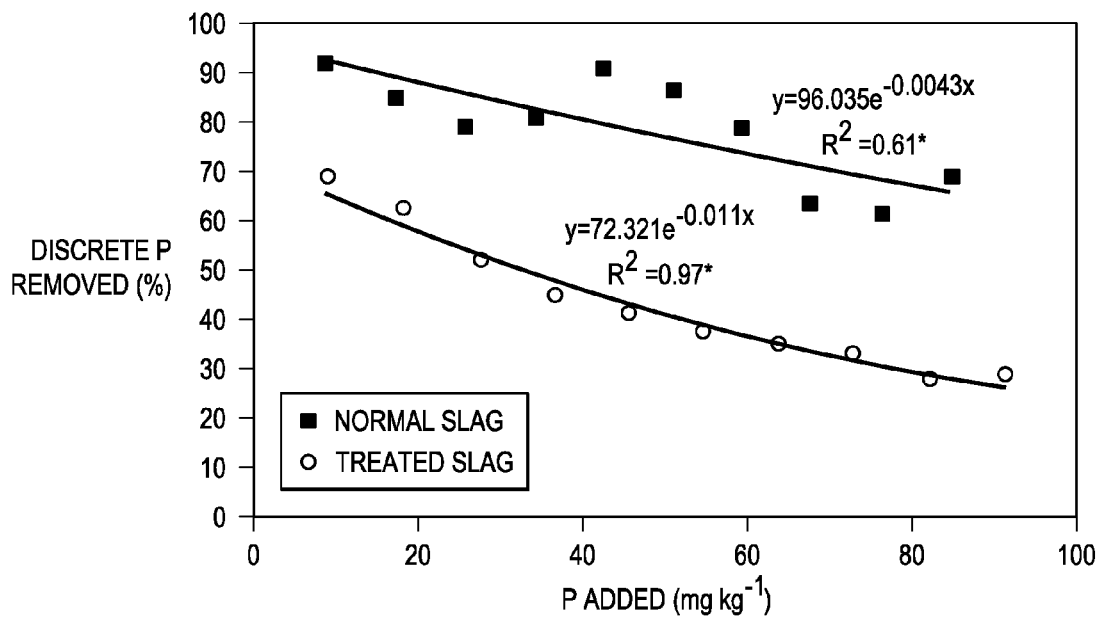
FIG. 2 is a graphical example of P removal curves for (a) normal and (b) coated slag at (a) 6 minute retention time and 1 mg P $L^{-1}$ solution and (b) 3 minute retention time and 10 mg P $L^{-1}$ solution.
Figure 2B:
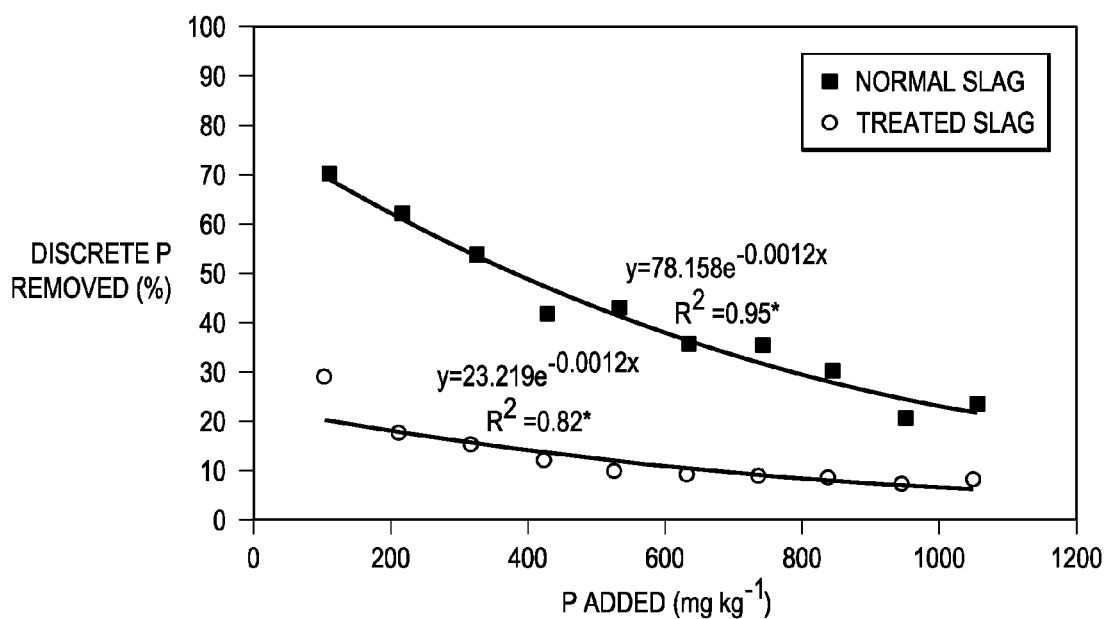
Figure 3:
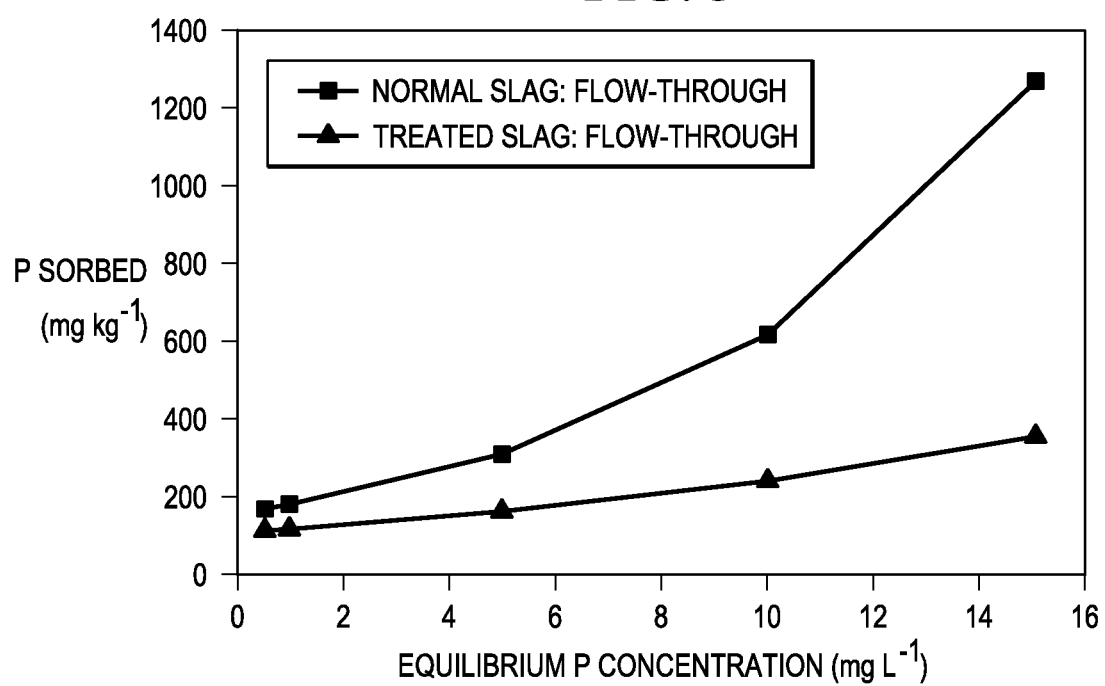
FIG. 3 is a graph showing phosphorus(P) sorption by normal and treated slag.

Referring now to FIG. 2, a cell 106 is shown in perspective. The cell 106 may be made from a metal, a polymer, or some other resilient material that will prevent water from escaping except via the outlet 110. Supports and other auxiliary structures may be utilized as needed. The outlet 110 may be provided with a screen or other water permeable covering to retain the byproduct 108, but allow water to escape. It is understood that the flow rate and retention time of water entering the cell 106 may be controlled by adjustment of the dimensions of the cell, the dimensions of the opening, and by the physical characteristics of the by-product 108. In implementing a P removal system 100, it is useful to be able to predict the amount of phosphorous that can be removed over a given time, the expected useful lifetime of the system 100, and other information. Thus a design model is disclosed herein that incorporates such information that may be useful in designing and implementing a P removal system.

The design model of the present disclosure is useful for designing phosphorus removal structures. Some uses for the model include estimating the amount, or mass, of a by-product (i.e., filtration materials) of interest necessary for removing a targeted load of a dissolved phosphorus, and estimate how much phosphorus a given structure will remove. In one embodiment, input to the model comprises: basic laboratory characterization of the material of interest: pH, buffer capacity, total Al, Ca, and Fe, ammonium oxalate extractable Al and Fe, water soluble Ca, bulk density, hydraulic conductivity, and mean particle size; desired retention time for the potential structure; and average dissolved P concentrations in runoff at the site of interest.

The amount of phosphorus that can be removed by a phosphorus removal structure (e.g., 100 of FIG. 1) is a function of: (i) chemical properties of the sorption materials being used; (ii) flow rate/retention time of water passing through the structure (iii) mass of sorption materials used; (iv) and phosphorus concentrations in the water to be treated.

The system of the present disclosure is useful for removing dissolved phosphorus from surface runoff or drainage water by sorption (e.g., precipitation or ligand exchange, of phosphorus onto sorption materials). Non-limiting examples of sorption materials include acid mine drainage residuals, flue gas desulfurization gypsum, steel slag, and drinking water treatment residuals. These are all considered industrial byproducts in most respect and would often be considered a waste product.

When the P removal system is no longer functional (e.g., the by-product 108 has adsorbed all the P that is can) the by-product 108 can be removed and replaced with fresh material. However, it is also possible to recharge the material in situ to extend the lifespan of the system 100. In one embodiment, steel slag is used as a sorption material and may be recharged by application of a highly sorptive mineral product to the saturated steel slag. This may also be more cost effective that removing and replacing the byproduct 108.

Experiment 1: Large Scale Pond Flow-Through

In one experiment, a large scale flow-through unit was constructed to treat water in a small pond, i.e., approximately 405 m², located at the at the Oklahoma State University turfgrass research farm. The pond receives subsurface drainage from research turfgrass plots and typically displays dissolved phosphorus concentrations of approximately 0.5 mg L$^{-1}$. The pond was a "closed" system with no spillway.

A flow-through unit was housed in a small plastic building and comprised a 0.5 horse power electric well pump that delivered pond water into the top of a 960 L stock tank that contained 454 kg of sieved slag. The average particle size of the slag was 7 mm in diameter. The hydraulic conductivity was 0.68 cm/sec, the bulk density was 1.8 g/cm$^3$, and the porosity was 38%. A drainage outlet at the bottom of the tank was connected to a 1.27 cm diameter hose which allowed treated water to return back to the pond. The water pump was wired to a float switch that prevented overflow of the tank. The pump was also wired to a timer to control flow events. Water was applied to the slag material for 20 h day$^{-1}$ allowing a 4 h rest period to prevent the pump from overheating. Treated and pre-treated water, i.e. outflow and inflow, was sampled at 0, 10, and 19.5 hours after initiation of a daily flow-through event. For the normal steel slag material, this occurred for 22 continuous days.

After the normal slag was "spent" (e.g., when inflow equaled outflow phosphorus concentration), the normal slag material was washed in the tank with clean tap water to remove sediment. After washing, a treatment process was initiated in situ for slag "rejuvenation". Rejuvenation included precipitating amorphous Al hydroxide minerals on the surface of the alkaline slag material. A drain plug was affixed in the drain line of the tank. Approximately 134 L of a 0.17 M aluminum sulfate solution ($Al_2[SO_4]_3 \cdot 12H_2O$) was poured into the tank, submersing all slag. Slag was "soaked" in the aluminum sulfate solution for 48 h before the drain plug was removed and all drainage water was collected and disposed of. The post-soaked or "treated slag" was allowed to air dry for one week. Approximately 1 kg of the treated slag was removed from the tank for future laboratory characterization and experimentation. Pond flow-through experimentation was then conducted in the same manner as the normal slag previously tested.

Experiment 1: Data Analysis

Discrete phosphorus sorption (%) under flow-through conditions was averaged among replications and described as a function of phosphorus added to the materials (mg kg$^{-1}$) using an exponential model (FIG. 2). The relationship between discrete phosphorus sorption and phosphorus added for every RT (retention time), and P combination was found to be statistically significant at P<0.05 based on use of the SAS (SAS Institute, 2003, *SAS User's Guide: Statistics*, SAS Inst. Cary, N.C.) "proc reg" command of an analysis program that conducted a regression analysis between discrete P removed and padded (it is understood that other linear regression techniques may be suitable). Two multiple linear regression (MLR) models were then constructed to predict the slope and intercept of this "design curve" (FIG. 2) as a function of phosphorus concentration and RT. Because the slope and intercepts were not normally distributed, these parameters were log transformed before producing the multiple linear regression model. The multiple linear regression model was produced using the SAS "proc reg" command with RT and P concentration as the independent variables. All four multiple linear regression models (two for each material) were significant at P<0.01.

The formula for discrete P removal (%) under flow-through conditions is described as a function of P added (x in equation 1, below) to the materials (mg P added kg-1 PSM) using an exponential model:

$$\text{Discrete P removal} = be^{mx} \quad (1)$$

Where b is the Y intercept and m is the slope coefficient for this relationship. One can determine how much cumulative phosphorus is removed by integration of the exponential equation:

$$\text{Cumulative P removed (\%)} = \frac{\int_0^x (be^{-mx})dx}{x} \quad (2)$$

In this case, "cumulative P removed" is the total amount of phosphorus that has been sorbed by the material up to point x, wherein P added to the material is in mg kg$^{-1}$. This is expressed as a percentage of x. Variables m and b are the slope and intercept, respectively, for the exponential relationship between x (P added) and discrete P removal (%). The point at which the design curve approaches zero percent discrete P removal represents the maximum amount of P that can be added (in units of mg P kg$^{-1}$) to the material at P saturation. In other words, this is the point at which the P concentration inflow=P concentration outflow. The amount of P added to reach this point of P saturation is described by the following function:

$$\text{Maximum P added} = \frac{\ln b}{-m} \quad (3)$$

This value of maximum P added can then be inserted as variable "x" into equation 2 along with the m and b values for that particular RT and P concentration of interest. The resulting cumulative P removed represents the maximum overall P removal under those conditions.

Experiment 1: Slag Characterization

Total concentrations of Ca, Mg, Fe, and Al (Table 1) were similar to those reported for EAF slag in previous studies, (see, e.g., Drizo, A. Y. Comeau, C. Forget, and R. P. Chapuis, 2002, "Phosphorus Saturation Potential: A Parameter for Estimating the Longevity of Constructed Wetland Systems," *Eng. Sci. Tech.* 36: 4642-4648; and Proctor, D. M., K. A. Fehling, E. C. Shay, J. L. Wittenborn, J. J. Green, C. Avent, R. D. Bagham, M. Connolly, B. Lee, T. O. Shepker, and M. S. Zak, 2000, "Physical and Chemical Characteristics of Blast Furnace, Basic Oxygen Furnace, and Electric Arc Furnace Steel Industry Slag," *Environ, Sci. Technol.* 34: 1576-1582) which are hereby incorporated by reference. The slag was dominated with Ca and Fe and the pH for the normal slag was relatively high, i.e., 10.9; see Table 1. Normal slag possessed some alkalinity but this was small compared to the finer sized fractions typically reported. For example, when expressed as calcium carbonate equivalent (CCE), normal slag contained only 0.07% compared to 18 to 80% reported for the fine fractions. The elevated pH and Ca concentrations are typical considering the presence of portlandite ($Ca[OH]_2$), calcite ($CaCO_3$), and calcium silicate ($Ca_2SiO_4$) identified by X-ray diffraction (Table 1).

After the normal slag was saturated with phosphorus from use in the pond filter and subsequent treatment with aluminum sulfate solution, some chemical properties were altered. The treated slag appeared visibly different from normal slag in that the former contained a white precipitant powder around the individual slag pieces. The most obvious chemical changes included a decrease in pH and alkalinity and increase in total S, Al, water soluble Ca and S (see, Table 1). Acidification treatment with aluminum sulfate clearly decreased pH and added Al and S. Dissolution of the Ca hydroxide, i.e., portlandite, and calcite minerals via acidification not only increased the water solubility of Ca but also resulted in the formation of gypsum ($CaSO_4$) with the added S from aluminum sulfate. Water soluble Al decreased with treatment due to the decrease in pH; Al becomes soluble at alkaline and acid pH but is precipitated as Al hydroxide minerals at near neutral pH. The increase in total Al from aluminum sulfate treatment is likely in the form of an amorphous Al hydroxide since no Al minerals were detected by X-ray diffraction.

Previous studies indicate that, for the Ca contained in slag materials to effectively precipitate phosphorus from solution, the Ca must be soluble and the solution pH buffered above 7. Although the normal slag has less soluble Ca compared to the treated slag, the alkalinity and pH of normal slag is higher than treated slag, potentially making the soluble Ca more effective at precipitating phosphorus from solution. Previous studies have demonstrated that the acid neutralizing capacity of crystalline and amorphous slags are well related to the phosphorus saturation capacity. The soluble Ca found in treated slag is likely in the form of gypsum, which has been shown to be a somewhat effective phosphorus sorbent. In addition, the amorphous Al hydroxides formed in the treated slag would be an effective phosphorus sorbent via ligand exchange of phosphorus onto terminal hydroxide groups. This mechanism would also occur on any Fe oxide/hydroxide minerals present in either material.

The normal slag displayed a higher K value (Langmuir binding strength coefficient) than treated slag (2.43 L mg$^{-1}$ vs. 0.007 L mg$^{-1}$; standard error=1.81 and 0.167 for normal and treated slag, respectively). A larger K value is often considered to indicate greater affinity for phosphorus compared to lesser values. On the other hand, $S_{max}$ (maximum sorption capacity of the soil) was less for normal slag compared to treated slag (686 vs. 6517 mg kg$^{-1}$; standard error=107 and 1318 for normal and treated slag, respectively). The higher K value for normal slag may be due to the greater "potency" of the dissolved Ca in normal slag to precipitate phosphorus since this material possessed a higher pH and alkalinity compared to the treated slag. However, at higher concentrations of added phosphorus combined with greater soluble Ca concentrations of treated slag, the treated slag may sorb more phosphorus than normal slag as suggested by the higher $S_{max}$ of treated slag.

Experiment 1: Results

Figure 4A:
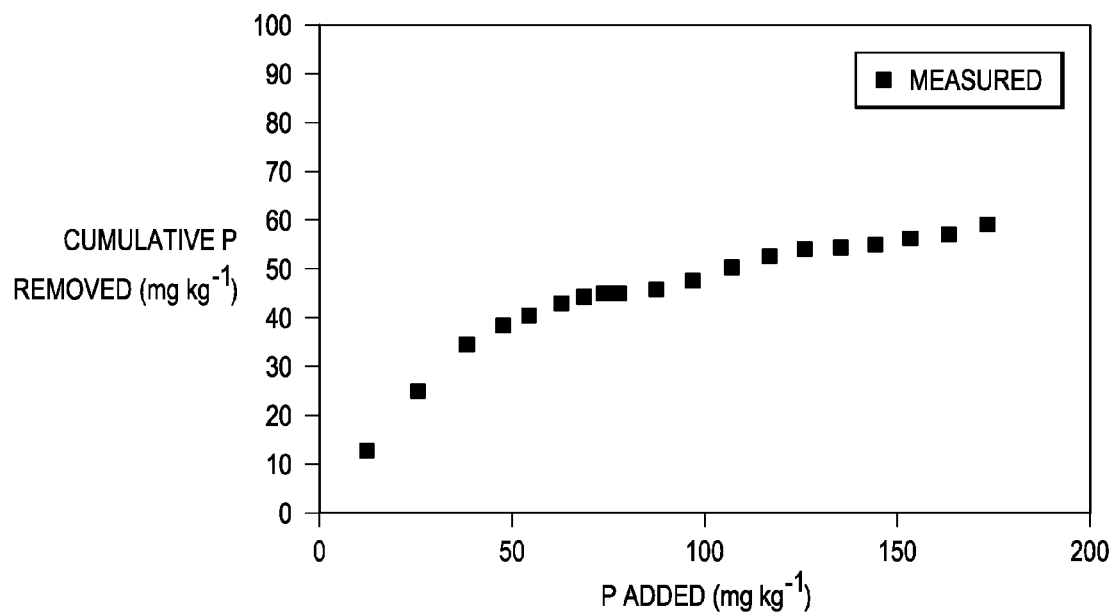
FIG. 4 is graphical representations of cumulative phosphorus (P) sorbed with P added among normal (a) and treated (b) slag tested in a pond filtration unit.
Figure 4B:
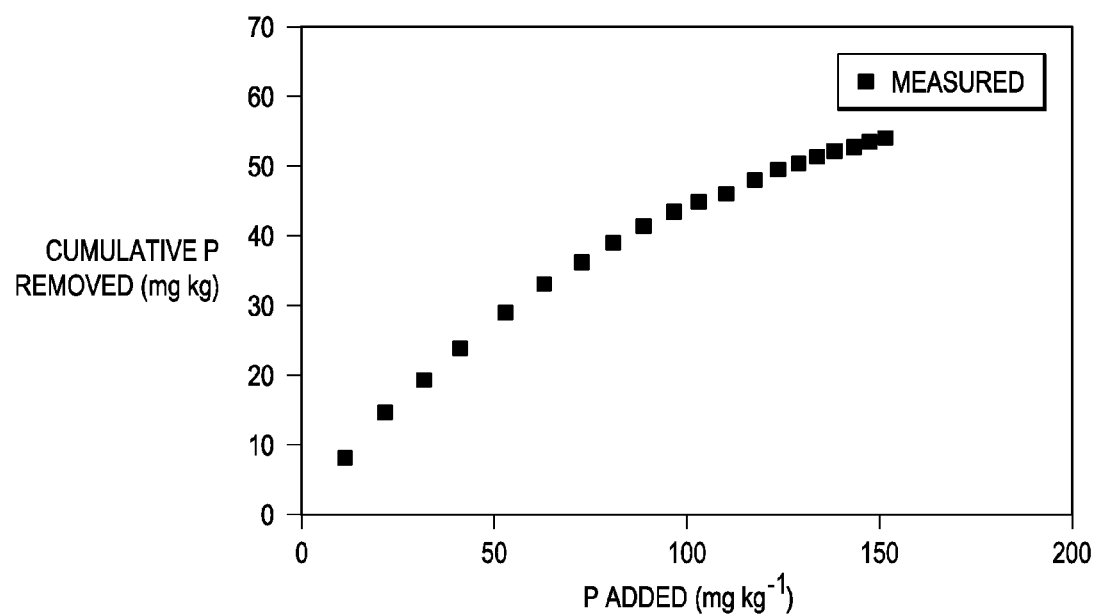

Results of the large scale pond flow-through experiment utilizing normal and treated slag are shown in FIG. 4. Flow rate was 8.5 Lmin$^{-1}$ and pond water was pumped into materials for 20 h per day (10,200 L per day). Details on experiment parameters and results are shown in Table 2. Similar to results from laboratory flow-through experiments, the decrease in discrete phosphorus removal with phosphorus addition between materials is similar but the initial phosphorus removal (i.e. Y intercept) was greater for normal than treated slag. Pond phosphorus conditions were similar for each experiment (see, Table 2). The pH of pond water during this experiment was 7.2 to 8.0, which was in the typical range for this particular pond prior to initiation of pumping. Actual phosphorus (P) removal was 59 and 54 mg P kg$^{-1}$ overall (i.e. cumulative) for normal and treated slag, respectively. Although the RT and P concentrations were slightly out of the range of flow-through model development conditions (i.e. RT>8 min and P<0.5 mg L$^{-1}$; Table 2), the predictions were reasonable (FIG. 4 and Table 2).

Experiment 2: By-Product Testing

In another experiment, twelve different industrial by-products common in the U.S. were characterized and tested for P sorption. These materials include fly ash, steel slag, acid mine drainage residuals (AMDRs), drinking water treatment residuals (WTRs), and flue gas desulfurization (FGD) gypsum. All acid mine drainage residuals (AMDRs) were collected from Pennsylvania. The AMDR1 and AMDR3 were both formed naturally from acid mine drainage water flowing out of an old well where iron became oxidized and precipitated after coming to the surface. Acid mine drainage water that produced AMDR3 was in contact with alkaline bedrock (Hedin, Bob, Hedin Environmental, personal communication, 2011). Acid mine drainage residuals 2 and 4 were collected from engineered facilities designed to remove acidity and precipitate Fe from acid mine drainage water. These engineered facilities utilized calcium carbonate during the acid mine drainage treatment process.

Both fly-ash samples were a product of a fluidized bed combustion process at a coal fired power plant. Fly-ash1 and Fly-ash2 were from power plants located in Muskogee, Okla. and Red Rock, Okla., respectively. The FGD gypsum was obtained from U.S. Gypsum (Baltimore, Md.) and produced by a coal fired power generation plant, where lime or calcium oxide was used to "scrub" the sulfur in the flue gas, resulting in the formation of relatively pure gypsum ($CaSO_4$).

Drinking water treatment residuals were collected from three different drinking water treatment plants. The Al-WTR1 and Al-WTR2 materials were collected from the AB-Jewell and Mohawk treatment facilities, respectively, located in Tulsa, Okla. Aluminum sulfate was used as the flocculating agent at both facilities. The Ca-WTR material is from the Stillwater treatment facility located in Stillwater, Okla. Calcium hydroxide was used at this facility. Slag fines were the <5 mm size fraction of electric arc furnace (EAF) steel slag collected from a steel production facility located in Ft. Smith, Ark. (Tube City, IMS). Excell Minerals was a soil amendment intended to supply Si to growing plants (Harsco Minerals, Mechanicsburg, Pa.).

Experiment 2: Material Characterization

All analyses were conducted in triplicate (except XRD) on air-dry samples sieved to 5 mm. Material pH was measured with a pH meter using a solid:DI (de-ionized) water ratio of 1:5. Electrical conductivity (EC) was also measured with a meter (Accument AB30) in the same solution. Materials were ground prior to analysis of total elements by EPA 3051 digestion method (nitric and hydrochloric acid; U.S. Environmental Protection Agency, 1997). Digestion solutions were analyzed for Ca, Mg, Fe, and Al by inductively coupled plasma atomic emission spectroscopy (ICP-AES). Samples were also extracted with DI water at a 1:10 solid:solution ratio in 50 mL centrifuge tubes for 1 h (low speed reciprocating shaker) followed by filtration with a 0.45 μm filter and analysis for Ca and Mg by ICP-AES. Amorphous Al and Fe (Oxalate Al and Fe) was determined by a 1:40 material:solution extraction ratio in a 50 mL centrifuge tube using 0.2M acid ammonium oxalate (pH 3) and a 2 h reaction time (low speed reciprocating shaker) in the dark (McKeague and Day, 1966). Extracted solutions were analyzed for Al and Fe by ICP-AES. A batch β isotherm was conducted in order to compare the P sorption capacity of each material. Briefly, 2 g of PSM was reacted (16 h, low speed reciprocating shaker) with a 30 mL solution containing 0, 0.03, 0.3, 0.81, 1.61, 3.23, 6.45, 12.90, 25.81, 51.61, and 103.23 mM P L-1 made from potassium phosphate. The matrix solution consisted of 5.6, 132, 110, 10, and 17 mg L-1 of Mg, Ca, S, Na, and K, respectively, using chloride and sulfate salts, followed by adjustment to pH 7. Note that ionic strength only slightly varied due to differences in P concentrations only. This matrix was chosen as it was found to be representative of agricultural runoff measured in a previous study, located on the Eastern Shore of Maryland, U.S. (Penn et al., 2007). Samples were then centrifuged at 2000 rpm for 15 min, followed by filtration with 0.45 μm Millipore membranes, and subsequently analyzed for P using ICP-AES. Langmuir parameters K and Smax (P sorption maximum) were estimated by a plot of solution equilibrated P concentration/P sorbed (dependent variable) against the solution equilibrated P concentration (independent variable). The slope and Y intercept of this linear plot is 1/Smax and 1/Smax*K, respectively (Essington, 2004).

Each material was also analyzed for crystalline minerals by X-ray diffraction (XRD) on a Philips (now PANalytical; Almelo, Netherlands) powder X-ray diffractometer. The ability of materials to maintain pH above 6.0 was determined by automatic titration (TitriLab 865; Radiometer Analytical, Villeurbanne Cedex, France) on a stir plate with an HCl solution (concentration dependent on material) to pH 6.0 on 2 g material suspended in 10 mL of DI water. This parameter will be referred to as "buffer index" (BI) for the remainder of the paper. Blanks and known "check" samples were included for all analyses, except for XRD.

Experiment 2: Laboratory Flow-Through

In order to test the effect of retention time (RT) and P concentration on P sorption in a flow-through setting, flow-through cells (high density polyethylene) were constructed as described in DeSutter et al. (2006). A diagram of the setup is found in Penn and McGrath (2011). Phosphorus sorption materials were mixed with acid washed, lab-grade sand (pure Si sand, 14808-60-7; Acros organics, Morris Plains, N.J.) in order to achieve a total pore volume of 1.26 cm$^3$ (5 g of sand+PSM; 40% porosity) and then placed in a flow-through cell. The proportion of PSM to sand varied depending on how P sorptive the material was. Less PSM mass was used for highly sorptive materials. The mass of PSM material used in a flow through cell varied from 0.1 to 1 g. A suitable amount that would not result in 100 or 0% P removal for the duration of the entire experiment was typically determined by trial and error. The purpose of this was to allow a more complete picture of P breakthrough (i.e. P sorption curve). A 0.45 μm filter was placed beneath the materials and the bottom of the cell was connected to a single channel peristaltic pump (VWR variable rate "low flow" and "ultra low flow", 61161-354 and 54856-070) using plastic tubing. The desired RT (RT [min] =pore volume [mL]/flow rate [mL min$^{-1}$]) was achieved by varying the pump flow rate which pulled solution through the cell. Flow rates required to achieve the desired RTs of 0.5, 3, 6, 8, and 10 min were 2.5, 0.42, 0.21, 0.16, and 0.13 mL min$^{-1}$, respectively. Essentially, the RT is the amount of time required for the solution to pass through the cell. These RTs represent a reasonable amount of time for runoff water to pass through a P removal structure; while an excessive RT may be effective at P sorption, it will reduce the total amount of runoff that can be treated under high flow conditions for a given mass of material (Penn et al., 2010). A constant head Mariotte bottle apparatus was used to maintain a constant volume of P solution on the materials. Materials were subjected to flow for 5 h in which the "outflow" from the cells was sampled at 0, 30, 60, 90, 120, 150, 180, 210, 240, 270, and 300 min. Solutions were analyzed for P by the Murphy-Riley molybdate blue method (Murphy and Riley, 1962). Discrete P sorption onto materials was calculated at each sampling time as a percentage decrease in outflow relative to inflow P concentration (i.e. source bottle).

Five different P concentrations were tested; 0.5, 1, 5, 10, and 15 mg L$^{-1}$ using solutions made from potassium phosphate. These P concentrations correspond with the range measured in studies of runoff from high P soils (>300 mg kg$^{-1}$ Mehlich 3-P) or soils to which manure or chemical fertilizer P have been recently applied to the surface (Vadas et al., 2007; Edwards and Daniel, 1993). The same matrix solution from the batch P isotherm experiment was used in flow-through experiments. All flow-through RT*P concentration combinations were duplicated for each material resulting in a total of 600 experimental units.

Experiment 2: Data Analysis and Model Development

Figure 5A:
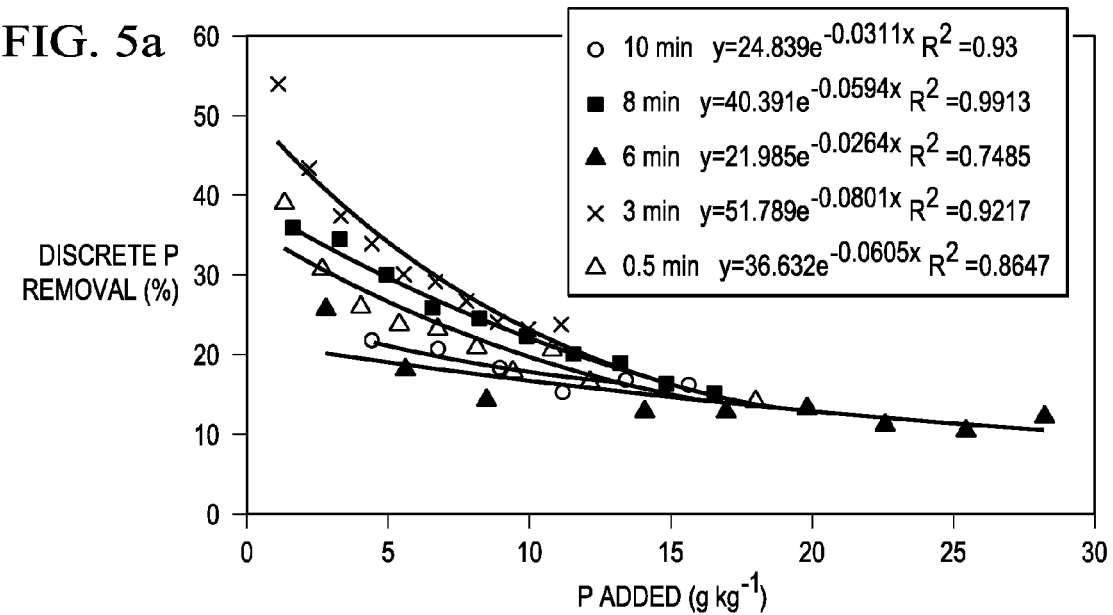
FIG. 5a is a graph of examples of experimentally determined flow-through phosphorus (P) removal curves for Al-WTR1 at 5 different retention times (RT) and 5 mg P L-1 inflow solution.

Discrete P removal (%) under flow-through conditions was described as a function of P added (x in equation 1) to the materials (mg P added kg$^{-1}$ PSM) using the previously described exponential model:

$$\text{Discrete P removal} = be^{mx} \qquad (1)$$

Where b is the Y intercept and m is the slope coefficient for this relationship. An example discrete P removal curve is shown in FIG. 5a with P addition units in g kg$^{-1}$ for greater clarity. Note that since this is an exponential decay equation, m is always negative. The relationship between discrete P removal and P added for every RT and P concentration combination (i.e. all 600 curves) was found to be statistically significant at p<0.05 based on use of the SAS (SAS, 2003) "proc reg" command. For each material tested, two multiple linear regression (MLR) models were then constructed to predict the slope and intercept of each P removal curve (example in FIG. 5a) as a function of P concentration and RT ("P" and RT" in equations 4a and 4b). Because the slopes (m in equations 1 and 4a) were not normally distributed, this parameter was log(base 10) transformed (log-slope) before producing the MLR model. Y intercepts (b in equations 1 and 4b) were also log(base 10) transformed. The MLR model was produced for each material using the SAS "proc reg" command with RT and P concentration as the independent variables and the slope or intercept as the dependent variables.

The results of the MLR models are two equations for predicting the shape (i.e. slope and intercept) of the design curve (equation 1) for each material, which takes the general form:

$$\log(-m) = (\alpha RT) + (\beta P) + \chi \qquad (4a)$$

$$\log(b) = (\delta RT) + (\epsilon P) + \mu \qquad (4b)$$

Where α and β are the design curve slope prediction coefficients for RT and P concentration respectively, χ is the intercept of the slope prediction equation, δ and ε are the design curve intercept prediction coefficients for RT and P concentration respectively, and μ is the intercept of the design curve intercept prediction equation. The P removal curve with predicted parameters is referred to as the "design curve":

$$\text{Discrete P removal} = \underline{b}e^{\underline{m}x} \qquad (5)$$

where discrete P removal is in units of %, $\underline{b}$ is the value of b predicted with Eq. [4a], and $\underline{m}$ is the value of m predicted with Eq. [4b].

After a design curve equation is produced (equation 3), integration of it will yield a prediction of cumulative P removal (%) at any given level of P added (x):

$$\text{Cumulative P removed} = \frac{\int_0^x (\underline{b}\,e^{\underline{m}x})\,dx}{x} \qquad (6)$$

The point at which discrete P removal approaches zero (1%; i.e. "spent") as described by the design curve will occur when the P inflow concentration=P outflow concentration and is calculated using the following equation:

$$\text{Maximum } P \text{ added} = \frac{\ln b}{-m} \quad (7)$$

Insertion of the maximum amount of P added determined from equation 7 into the x value for equation 6 will result in the total amount of P predicted to be removed by the material under the conditions (RT and inflow P concentration) employed for the design curve utilized. Using percent cumulative P removed and maximum P added from equations 6 and 7, one can simply estimate the amount of P sorbed (mg kg$^{-1}$) at the point in which the material is spent.

In order to assess the impact of by-product properties on P removal in a flow-through condition, the SAS "stepwise" procedure was utilized. Essentially, the design curve coefficients used to estimate m and b (shown in equations 4a and 4b) were predicted as a function of material properties.

Experiment 2: Materials Characterization

In discussion of the by-products characterization, it is useful to generally categorize materials as mostly resulting in either Ca/Mg (precipitation) or Al/Fe (ligand exchange and precipitation) P sorption mechanisms (Penn et al., 2011b). However, there is clearly some overlap in these two groups of mechanisms. Briefly, the ideal Ca/Mg sorption materials will be buffered at a high pH, and contain a large amount of total Ca and Mg that is highly soluble. Conversely, the ideal Al/Fe sorption materials will not have a high pH and contain large amounts of amorphous Al and Fe (Penn et al., 2011b). Consider that the hydroxide ion becomes a strong competitor with P as pH increases. As expected, the AMDR materials were among the highest in total Fe and amorphous Fe (i.e. oxalate extractable Fe). Two of the four AMDR materials also contained the iron hydroxide mineral goethite, contained appreciable Al, and were acidic (AMDR1) or poorly buffered above pH 6 (AMDR 3; Table 3). As a result, retention by AMDRs 1 and 3 is likely dominated by Al/Fe. Two of the AMDR materials were also elevated in total Ca and pH (AMDR 2 and 4); XRD analysis showed that these two AMDRs contained Ca minerals, gypsum and calcite (Table 3). Some AMDRs have been shown to sorb appreciable amounts of P by both Al/Fe and Ca/Mg mechanisms (Penn et al., 2011b). The AMDR properties are a result of both the source of acid mine drainage and the type of treatment process used to neutralize the acidity and precipitate dissolved Al and Fe (Hedin, et al., 1994). Other studies have also shown the ability of AMDRs to sorb P (Fenton et al., 2009; Sibrell et al., 2009; Dobbie et al., 2009; Heal et al., 2005). Note that the Langmuir derived Smax and K values from the batch isotherms greatly varied between AMDRs (Table 3). The Ca rich and highly pH buffered AMDR4 showed the highest Smax yet the lowest K value among all PSMs Fly-ash and slag materials contained appreciable total Ca and an elevated pH that was relatively well buffered compared to some other materials (Table 3). However, slag also possessed one of the largest total Fe concentrations. An important mineral in regard to P precipitation with Ca was identified in the slag material. Portlandite is a Ca hydroxide mineral that is more soluble and alkaline compared to the Ca carbonate mineral calcite. As expected, the FGD gypsum was dominated by Ca that was highly soluble. However, this material was poorly buffered compared to the other Ca dominated materials such as fly-ash, slag fines, and Excell Minerals (Table 3). Any Fe, Al, and Mg are considered impurities due to the flue gas scrubbing process. Fly ash samples and slag displayed similar Langmuir Smax values from the batch isotherm, but were lower compared to FGD gypsum. The greater Smax of FGD gypsum may have been a result of the higher soluble Ca concentrations (Table 3).

Characteristics of the WTRs are a function of both the source of water being treated and the type of treatment process (Ippolito et al., 2011). In our study the Ca-WTR was produced from use of Ca hydroxide at the drinking water treatment plant, while Al-WTRs were produced from using aluminum sulfate as a flocculating agent. As expected, the Ca-WTR was dominated with Ca and possessed an elevated pH and BI while the Al-WTRs were dominated with Al and had a near neutral pH with a lower BI. Note that the Al-WTRs were among the highest in oxalate Al, which is likely why their K values were of the top five largest.

Excell Minerals was dominated with Ca, yet contained large amounts of Mg, Al, and Fe. X-ray diffraction identified tri-calcium magnesium orthosilicate (a highly soluble Ca mineral), however, due to its elevated pH and the largest BI it is likely that this material would primarily remove P by the Ca/Mg mechanism. Langmuir Smax and K values from the batch isotherm were similar between Excell Minerals and the slag. This is not surprising since the total Ca, water soluble Ca, and pH was also similar.

Experiment 2: Retention Time and Inflow Phosphorus Concentrations

Figure 1B:
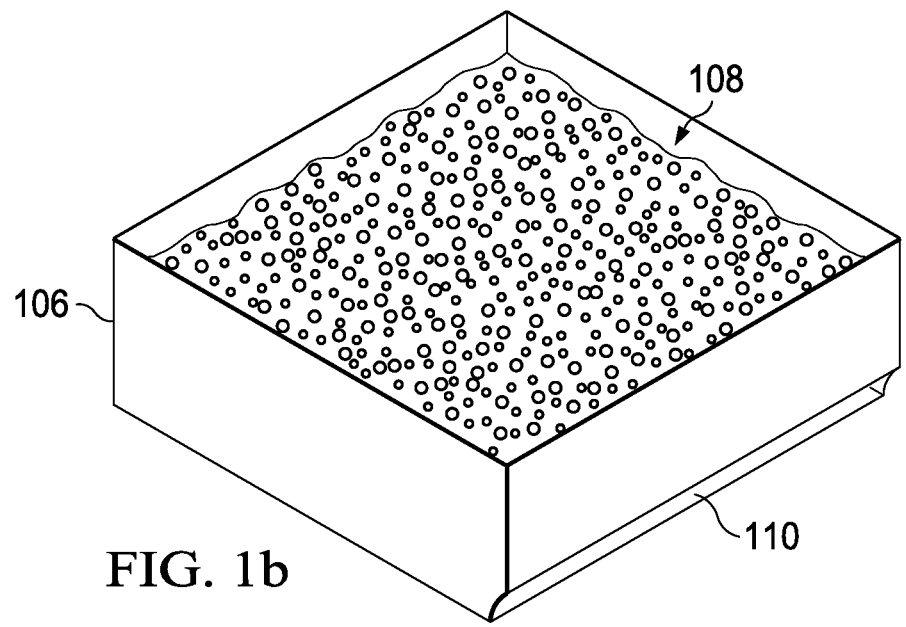
FIG. 1b is a perspective view of a phosphorous retention cell according the present disclosure
Figure 5B:
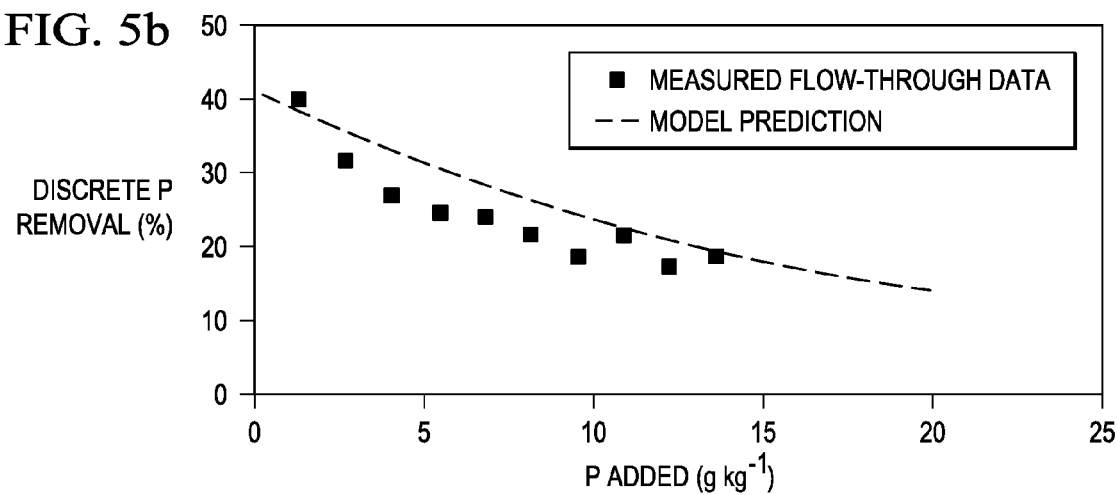
FIG. 5b is a graph of a comparison of the experimentally determined flow-through removal curve at a 0.5 min RT to the predicted "design curve" equation.
Figure 5C:
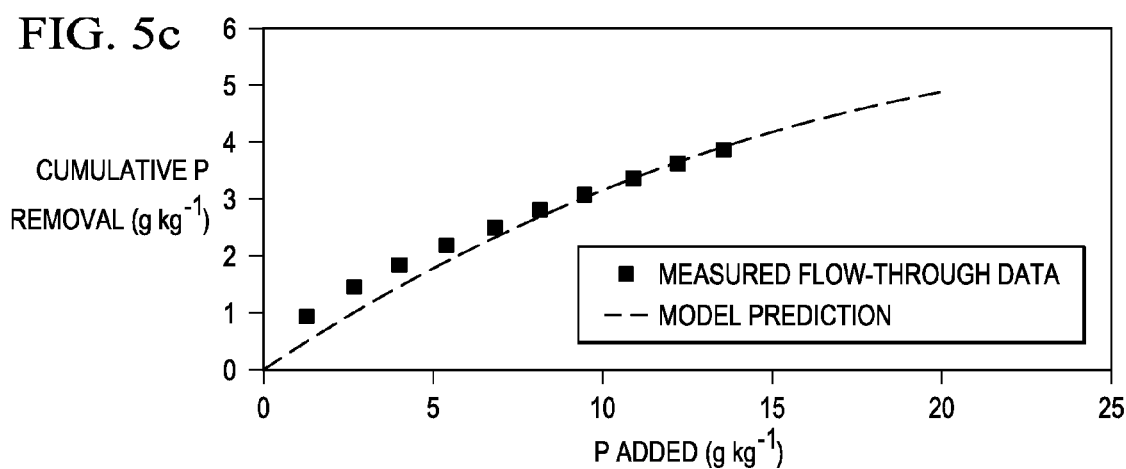
FIG. 5c is a graph of Cumulative P removal for the same data set and the associated model prediction (Note that for clarity of the axes, values for added P and cumulative P removal were converted from mg kg-1 to g kg-1.)
Figure 6A:
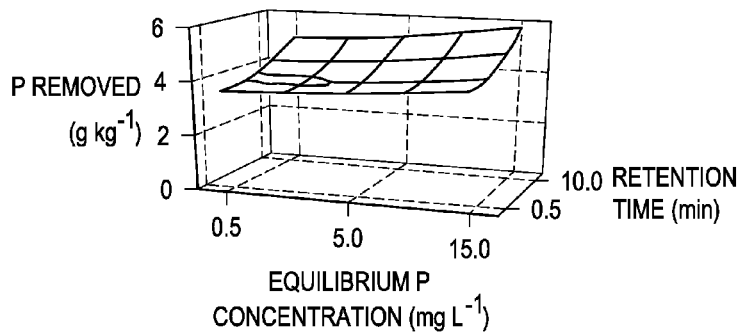
FIG. 6a is a graph of maximum phosphorus (P) removal under flow-through conditions at a retention time of 0.5 and 10 min for AMDR1.
Figure 6B:
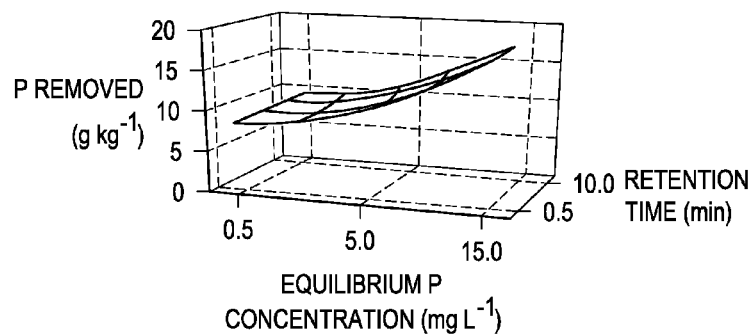
FIG. 6b is the same graph for AMDR2.
Figure 6C:
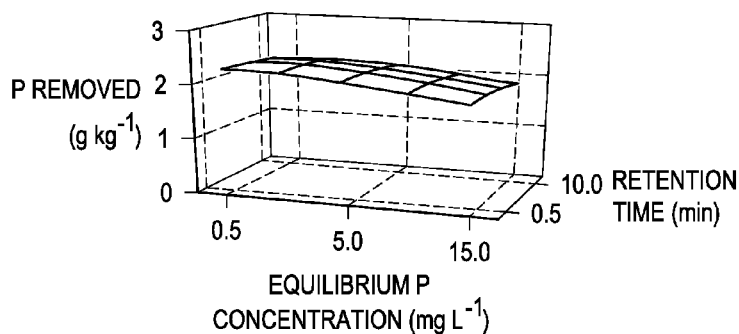
FIG. 6c is a graph for AMDR3.
Figure 6D:
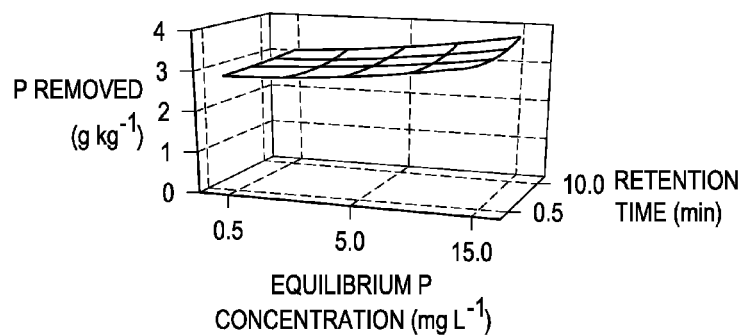
FIG. 6d is a graph for AMDR4.
Figure 6E:
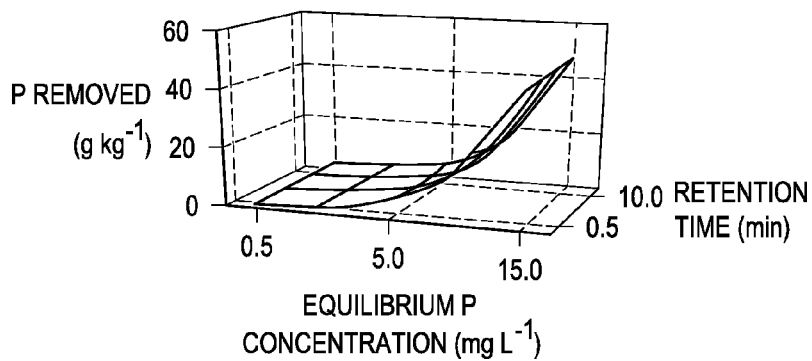
FIG. 6e is a graph for slag.
Figure 6F:
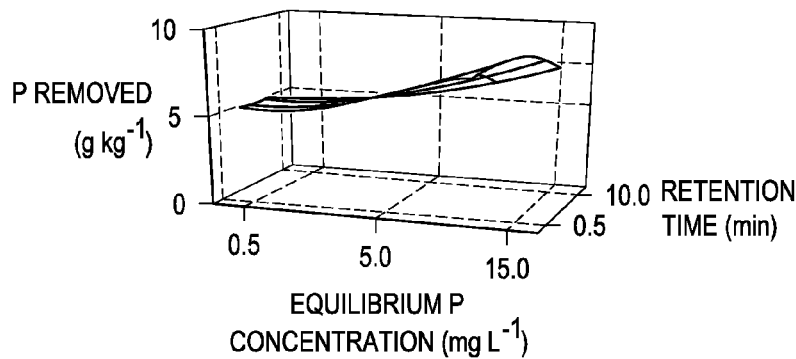
FIG. 6f is a graph for fly-ash1.
Figure 6G:
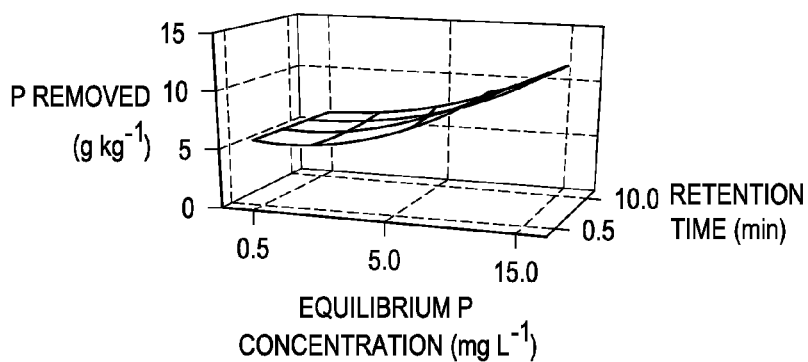
FIG. 6g is a graph for fly-ash2.
Figure 6H:
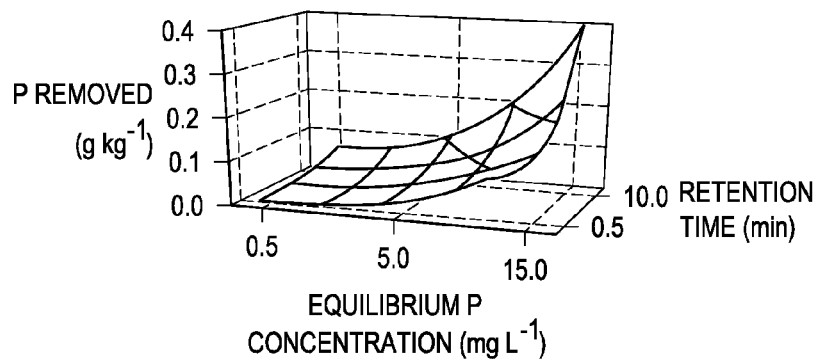
FIG. 6h is a graph for FGD gypsum.
Figure 6I:
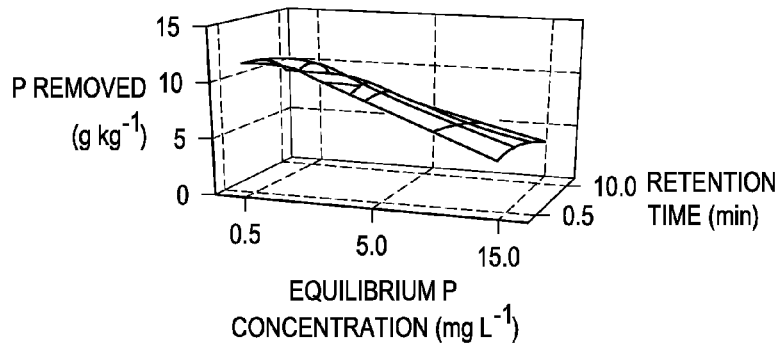
FIG. 6i is a graph for Ca-WTR.
Figure 6J:
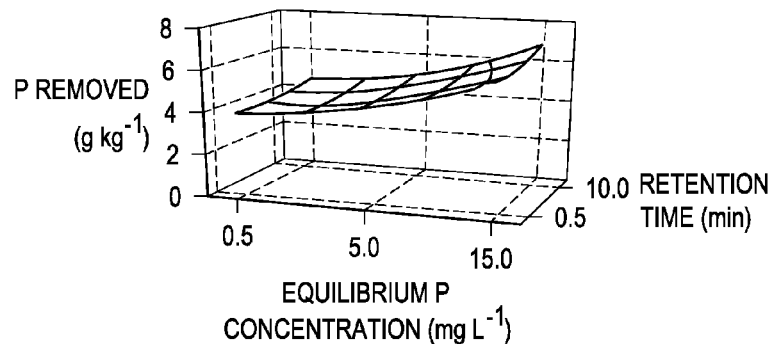
FIG. 6j is a graph for Al-WTR1.
Figure 6K:
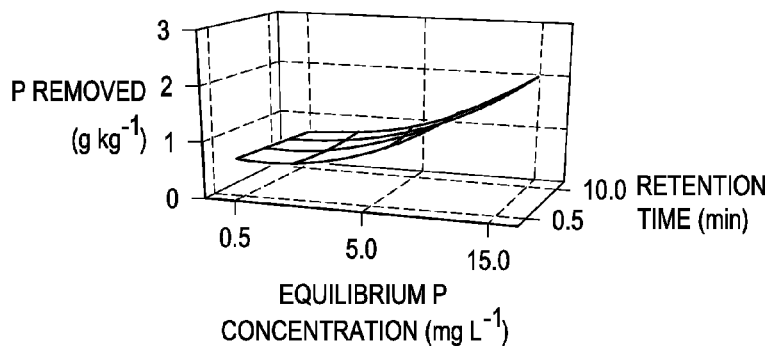
FIG. 6k is a graph for Al-WTR2.
Figure 6L:
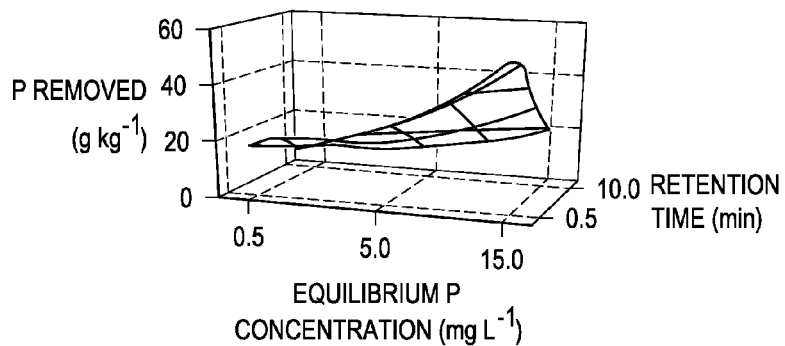
FIG. 6l is a graph for Excell Minerals.
Figure 7A:
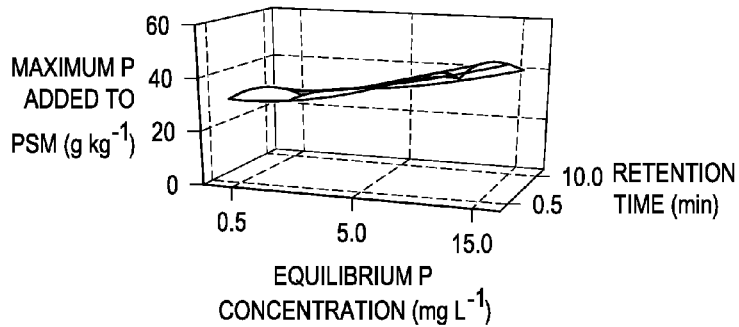
FIG. 7a is a graph of maximum phosphorus (P) added to by-products at the point of equilibrium under flow-through conditions (i.e. P added when inflow=outflow concentration) at a retention time of 0.5 and 10 min for AMDR1.
Figure 7B:
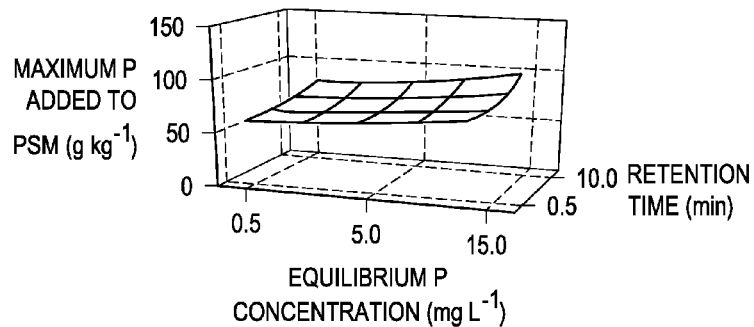
FIG. 7b is a graph for AMDR2.
Figure 7C:
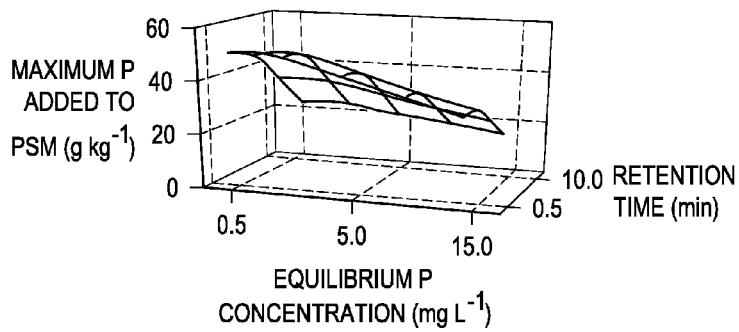
FIG. 7c is a graph for AMDR3.
Figure 7D:
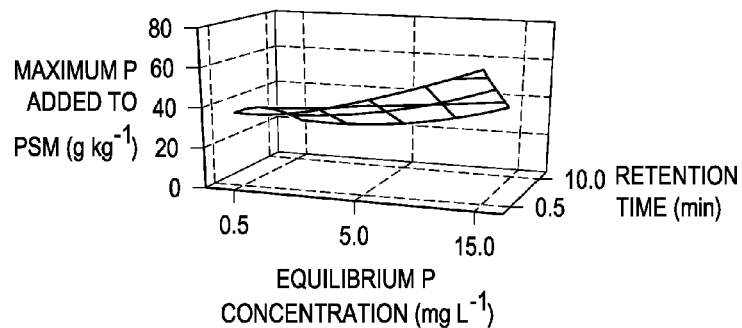
FIG. 7*d* is a graph for AMDR4.
Figure 7E:
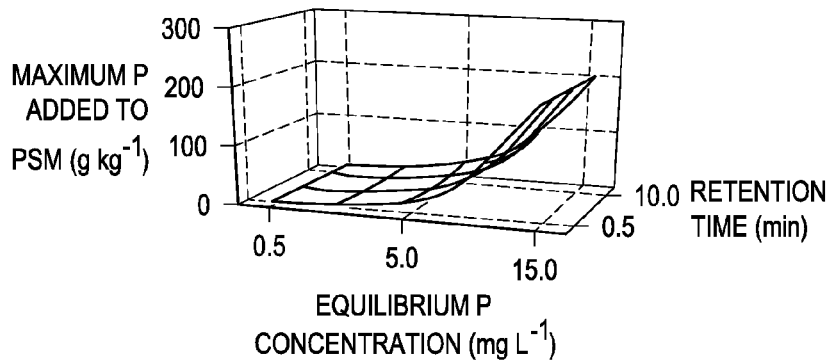
FIG. 7*e* is a graph for slag.
Figure 7F:
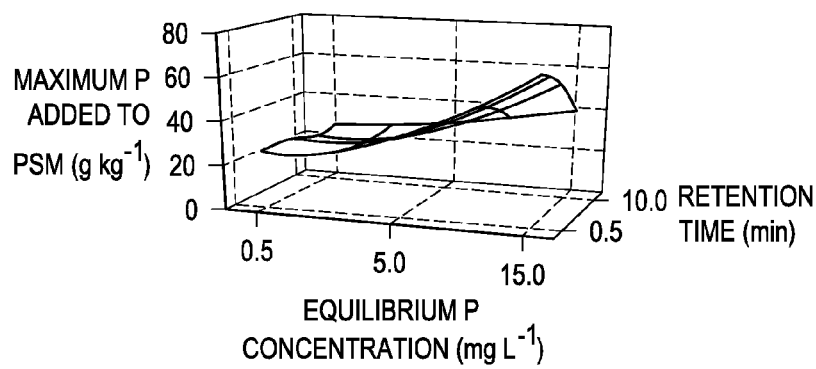
FIG. 7*f* is a graph for fly-ash1.
Figure 7G:
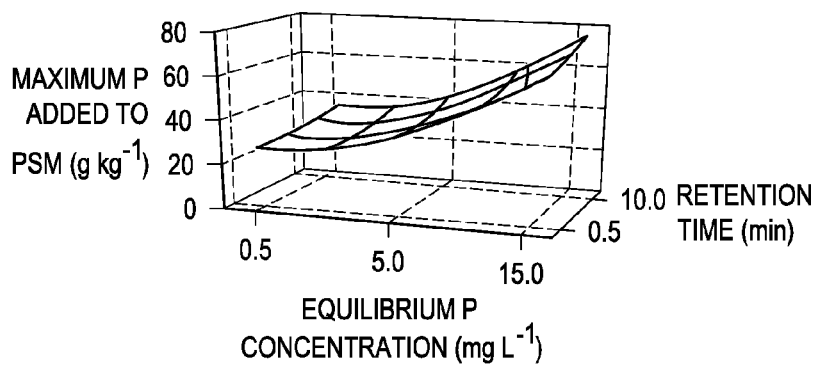
FIG. 7*g* is a graph for fly-ash2.
Figure 7H:
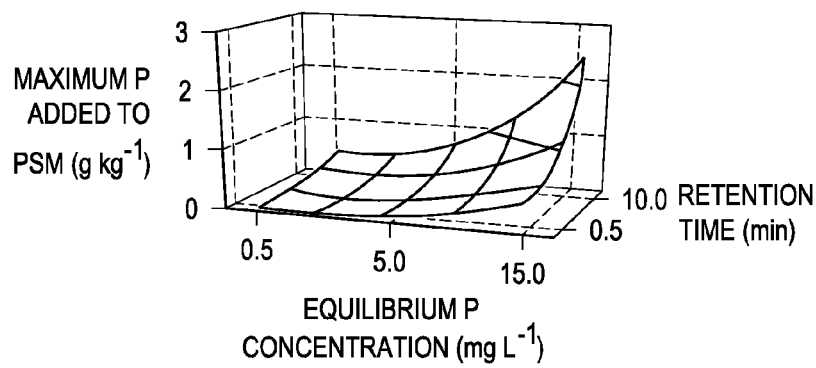
FIG. 7*h* is a graph for FGD gypsum.
Figure 7I:
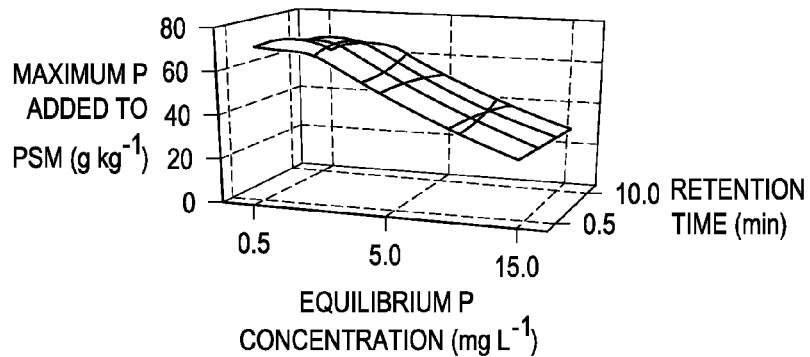
FIG. 7*i* is a graph for Ca-WTR.
Figure 7J:
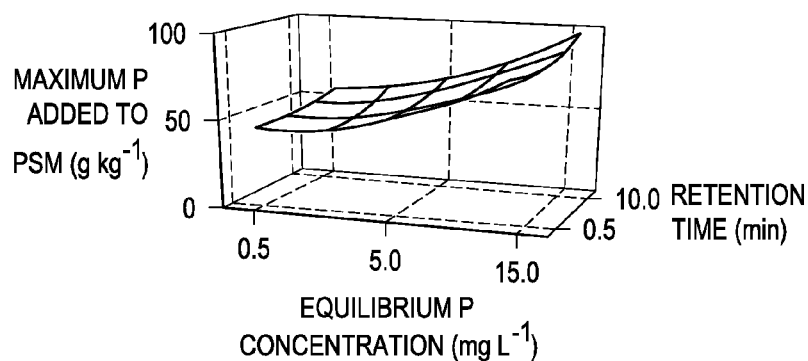
FIG. 7*j* is a graph for Al-WTR1.
Figure 7K:
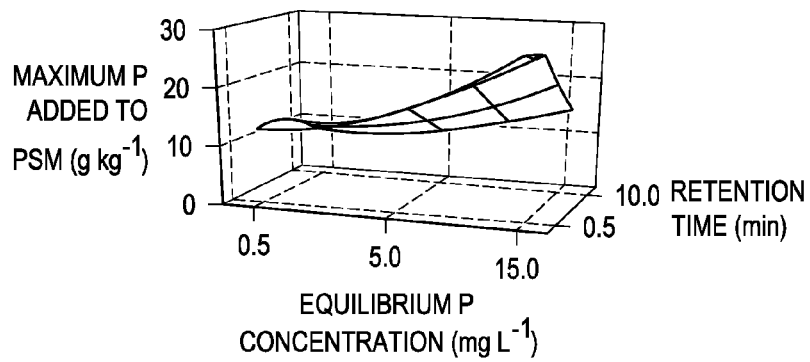
FIG. 7*k* is a graph for Al-WTR2.
Figure 7L:
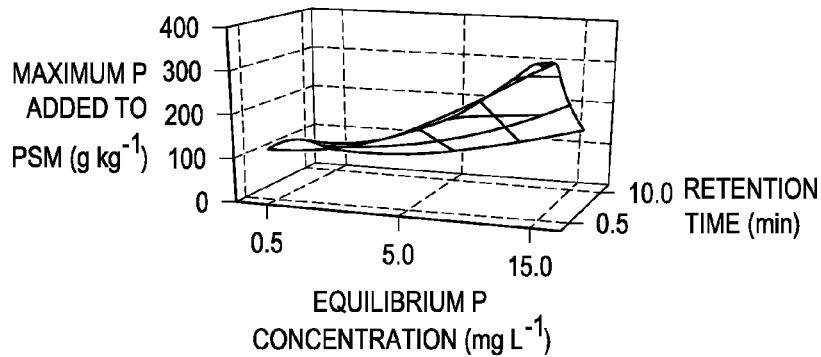
FIG. 7*l* is a graph for Excell Minerals.

Examples of experimentally determined P removal flow-through curves are shown in FIG. 1a. As previously mentioned, the shape of this curve will dictate the degree of P removal and longevity of a PSM used in a P removal structure. All P removal curves were statistically significant at p<0.05 with an $R^2$>0.75. The purpose of the model is to predict the shape of the P flow-through curves using RT and P concentrations; this predicted curve is referred to as the "design curve". By estimating slope (m) and Y intercept (b) parameters of the discrete P removal relationship (equations 4a and 4b), one can predict the design curve (FIG. 5b; equation 5) and then determine how much cumulative P is removed after P loading the material by integration of the exponential equation for the design curve (FIG. 5c; equation 6). The point at which the design curve approaches zero percent discrete P removal (e.g. 1%) represents the maximum amount of P that can be added to the material (in units of mg P kg$^{-1}$) before P saturation (equation 7). This is the point at which the P concentration inflow=P concentration outflow and the material is no longer effective at removing P. This is a direct result of the shape of the design curve. Essentially, a P removal structure exhibiting a design curve with a large Y intercept and shallow (i.e. less steep) slope will be able to remove more P from solution for a greater period of time compared to that with a smaller Y intercept or steep slope. Design curves for the PSMs used in this study can be predicted by inserting the coefficients listed in Tables 4 and 5 into equations 4a and 4b for a given RT and P concentration.

The model building exercise for predicting the shape of the design curve showed that RT and inflow P concentration were statistically significant variables for some materials for estimating the slope (m; Table 4). Retention time had a significant impact on design curve slope for only 6 of the 12 materials, while 9 materials displayed a significant influence of P concentration on slope. The overall MLR model for design curve slope was significant for all but 3 materials (AMDR2, fly-ash2, and Ca-WTR) at the p<0.05 level; however, Ca-WTR was significant at the p<0.1 level.

Among the significant RT coefficients for slope (α), only one material displayed a statistically significant negative value (FGD gypsum, Table 4). Thus, for FGD gypsum RT has a negative influence on predicted slope coefficient m, so the final slope (−m) becomes less negative with increased RT, which corresponds with more P sorption. FGD gypsum may require a longer RT for P removal compared to the other Ca rich materials due to the fact that it is poorly buffered (BI=0.032; Table 3).

In regard to predicting the design curve Y intercept (b), RT and inflow P concentration were statistically significant variables for some materials for estimating the Y intercept (b; Table 5). RT had a significant impact for 6 materials and P concentration was significant for 6 materials as indicated by coefficients $\beta$ and $\epsilon$ (Table 5). An overall MLR model was significant in estimating design curve Y intercept for eight materials. Materials with more positive RT coefficients for design curve Y intercept indicate that increasing RT will increase the design curve Y intercept more than materials with lower RT coefficients. Therefore, increasing RT will improve initial P removal.

Similarly, the less negative P concentration coefficients ($\epsilon$) indicate that increasing inflow P concentrations will not decrease the design curve Y intercept as much as for materials possessing more negative coefficients ($\epsilon$; Table 5). In general, increasing inflow P concentrations will decrease the Y intercept of the design curve.

As previously mentioned, the coefficients listed in Tables 4 and 5 can be used to predict a design curve (equation 5) for the 12 materials. A user can apply this approach to flow-through data produced using PSMs of interest, allowing one to extrapolate P removal for any given RT and P inflow concentration combination. This is particularly useful since the RT and P concentrations will vary among structures/sites. The design curve can then be used for sizing a P removal structure, or predicting how much P it will remove and how long it will last before P saturation. By inserting the coefficients for Al-WTR1 listed in Tables 4 and 5 into equations 4a and 4b, an example design curve equation is produced as shown in FIG. 5b. Integration of the resulting design curve (equation 5) via equation 6 produced the cumulative P removal curve in FIG. 5c. Further, use of equation 7 indicates that the maximum amount of P that can be added to one kg of Al-WTR1 at the point of being "spent", under conditions of RT=0.5 min and inflow P concentration=5 mg L$^{-1}$ is 66 g. With this mass of P input (66 g P kg$^{-1}$), the material would, according to equation 6 retain 10.7%, or 7.1 g P kg$^{-1}$ Al-WTR1. Note that although FIG. 5 expresses P addition in units of g kg$^{-1}$ for greater clarity, the x value (P added) in equations 1, 5, and 6 are in units of mg kg$^{-1}$.

Experiment 2: Effect of Material Properties on Design Curve Model Coefficients

The purpose of the "stepwise" procedure was not necessarily to utilize the results for predicting design curves from material properties, but for assessment of the impact of material properties on P removal under flow-through conditions. The "stepwise" MLR program indicated which material properties were the most important in regard to estimating the design curve model coefficients. For predicting design curve slope using RT ($\alpha$), the WS Ca and oxalate extractable Fe concentrations were the most significant variables (Table 6). The negative coefficient for WS Ca in Table 6 indicates that increasing WS Ca decreases the impact of RT on the slope. This is due to the fact that a high amount of Ca in solution will promote P removal via precipitation; the more Ca in solution, the less that pool is exhausted by P during precipitation which will prevent the slope of the design curve from decreasing dramatically with changes in RT. The opposite was found for oxalate extractable Fe; high concentrations results in the potential for RT to have a greater impact on design curve slope (an increase in oxalate Fe will make the slope more steep).

Surprisingly, total Mg and WS Mg had a significant impact on how inflow P concentrations affect design curve slope ($\beta$; Table 6). This may simply be a result of a co-correlation with Ca due to the fact that total Mg was significantly correlated ($p<0.05$) with total Ca. Also, Mg behaves similarly to Ca in regard to precipitation of P since both occur under alkaline conditions (Lindsay, 1979).

Use of the intercept parameter for the model that predicts design curve slope ($\chi$) is a good way to generally compare design curve slope between materials without confounding with the effects of inflow P concentration or RT. In other words, materials with a larger (or less negative) slope model intercept coefficient will generally have a steeper negative slope compared to materials with a smaller (more negative) model intercept coefficient. For example, based on the slope model intercept coefficient shown in Table 4, FGD gypsum (-1.1482) will generally have the steepest design curve slope. Based on the stepwise analysis, materials with greater amounts of oxalate Al and Fe will generally possess smaller log–slope values, or in other words, a less steep slope. Many studies have shown that oxalate extractable Al and Fe are representative of the amorphous Al/Fe oxyhydroxide pool that strongly sorbs P (Cucarella and Renman, 2009; Leader et al., 2008).

In regard to the design curve Y intercept, oxalate Fe was found to have a significant impact on how RT affects the design curve Y intercept ($\delta$; Table 6). As expected, increasing RT will increase the design curve Y intercept more for materials with higher amounts of oxalate Fe compared to those with less. In other words, oxalate Fe-rich materials will maintain a higher design curve Y intercept (or decrease less) as RT decreases.

Similarly, an increasing material WS Ca content will allow inflow P concentration to have a greater impact on the design curve Y intercept by making the coefficient less negative (c; Table 6). Therefore, materials rich in WS Ca will not decrease the design curve Y intercept as much when inflow P concentrations increase compared to materials with lower WS Ca.

In a general comparison of the model intercept coefficients for predicting design curve Y intercepts between materials ($\mu$; Table 6), the stepwise model showed that materials with higher BI will possess greater design curve Y intercepts compared to less buffered materials. As previously discussed, a well buffered material is necessary for a Ca phosphate precipitation mechanism to be most effective, since precipitation of a Ca phosphate will produce acidity in solution (Lindsay, 1979). For example, a material like FGD gypsum may possess high amounts of WS Ca, but much of this Ca will not be able to effectively precipitate with P unless the pH is well buffered above 6. Interestingly, the stepwise procedure also showed that materials rich in WS Mg generally possessed lower design-curve Y intercepts. As suggested by previous studies (Cao and Harris, 2007) this might be due to Mg preventing the precipitation of Ca phosphates.

Experiment 2: Examples of Model Results

FIG. 6 displays the amount of P sorbed by all 12 by-products at different equilibrium (i.e. inflow) P concentrations and RTs. These values were determined by inserting the coefficients from Tables 4 and 5 into equations 4a and 4b at different P concentrations (0.5, 1, 5, 10, and 15 mg P L$^{-1}$) and RTs (0.5, 1, 5, and 10 min). Predicted coefficients b and m were then inserted into equation 7 for maximum P added at the point of being "spent", and this value was then inserted into equation 4 (x) along with b and m for estimation of maximum P sorbed under the given conditions. In general, FIG. 6 suggests that AMDR2, slag, and Excell Minerals will sorb the most P under flow-through conditions at equilibrium, while FGD gypsum will sorb the least P. Langmuir Smax values from the batch isotherms (Table 3) were poorly correlated to the maximum P sorbed under flow-through conditions at a 10 min RT and 15 mg P L$^{-1}$ inflow solution ($R^2$=0.03). This was expected since flow-through conditions add a much smaller concentration of P, allow for a constant replenishment of reactants (i.e. solution P), removal of reaction products, and a shorter retention time compared to a batch isotherm (Penn and McGrath, 2011). In general, the Langmuir Smax value determined from the batch isotherm was 44 to 99% greater than the flow-through estimated P removal values. In the batch experiment a maximum of 3200 mg L$^{-1}$ was used, and the contact time was 16 h, versus max. 15 mg L$^{-1}$ and 0.5 to 10 min contact time for a total of 5 h for the flow-through experiment. One exception was the slag material which sorbed more P via flow-through conditions compared to batch.

Examination of RT coefficients and p values in Tables 4 and 5 and visual observation of FIG. 6 suggested that for most materials there was not much difference in P removal between RTs, except for AMDR1, FGD gypsum, Ca-WTR, and Excell Minerals. For all other by-products, this lack of appreciable difference between extreme RTs could be interpreted as relatively fast P sorption kinetics. It is expected that for materials in which precipitation is the dominant P sorption mechanism, an increase in RT would appreciably increase P sorption as evident for AMDR1 and FGD gypsum. Note that AMDR1 was dominated with Al and Fe and possessed a pH (3.2) suitable for Fe and Al to be soluble (Table 3); in fact, this material contained the highest concentration of water extractable Fe (75 mg kg-1; data not shown). Therefore one would expect some precipitation of Fe and Al phosphates rather than only ligand exchange onto Al and Fe oxides/hydroxides. Similarly, the FGD gypsum will dominantly remove P by precipitation with Ca since this material was dominated with soluble Ca (Table 3). Interestingly, Ca-WTR and Excell Minerals showed greater P removal at the lower RT compared to a 10 min RT (FIG. 6). This could be interpreted as very fast P sorption kinetics; so fast that the lower flow rate of P addition to the material (i.e. lesser amounts of P added to the PSM mass per unit time) was limiting P sorption more than the speed of the reaction. This could be a result of similarities among those by-products in regards to elevated total Ca, water soluble Ca, pH, and BI (Table 3), all of which will promote greater Ca phosphate precipitation and perhaps faster kinetics. By the same logic, FGD gypsum displayed the opposite behavior (i.e. slower P sorption kinetics at shorter RT) due to the fact that although it contained appreciable total Ca and water soluble Ca, the pH was not sufficiently large or buffered enough for fast Ca phosphate precipitation and therefore a greater RT was necessary to increase P removal. Another explanation for greater P removal at the lower RT (i.e. faster flow rate) for these by-products is that the slower removal of reaction products was limiting further Ca phosphate precipitation (Penn and McGrath, 2011).

In regard to the impact of P inflow concentration, FIG. 6 and Tables 4 and 5 shows that some by-products such as slag, FGD gypsum, Al-WTR2, and Excell Minerals were most responsive to increases in P concentrations. For example, at a RT of 10 min, slag, FGD gypsum, Al-WTR2, and Excell Minerals increased P removal 95, 82, 63, and 61%, respectively, as P inflow concentration increased from 1 to 15 mg P L$^{-1}$. Such an increase in relative P removal with solution inflow P concentrations suggests that these materials dominantly removed P via precipitation processes. An unusual result was the decrease in maximum P removed by Ca-WTR with increasing P concentration (FIG. 6). The reason for this behavior is not known. It is unlikely due to desorption of native P on the material since the water soluble P of Ca-WTR was only 0.029 mg kg$^{-1}$ (data not shown). Based on the raw data from laboratory flow-through experiments, this decrease in P removal with increased inflow P concentration is real and not a flaw in the Ca-WTR model.

Similar to FIG. 6, FIG. 7 displays the amount of P added to the by-products at equilibrium, or in other words, the amount of P that could be added until the material becomes "spent" and no longer removes P. These values were estimated from the design curve equations for each material under the given conditions and applied to equation 7. Note that this maximum amount of P added shown in FIG. 7 and determined from equation 7 was used to calculate the maximum P sorbed, shown in FIG. 6. For many of the by-products, the lower RT often resulted in the addition of a greater P load to achieve equilibrium under flow-through conditions (FIG. 7). This is due to the fact that more of added P solution is able to move through the material without being sorbed at the short RT (i.e. higher flow rate) compared to the longer RT. In other words, the shorter RT is often less efficient at P removal compared to a longer RT.

The importance of the maximum P removal values shown in FIG. 7 is that they provide an estimate of longevity for each by-product. For example, if a P removal structure was constructed to achieve a hydraulic RT of 10 min with AMDR4, and received a P inflow concentration of 5 mg L$^{-1}$, it could receive a total of 25 g P kg$^{-1}$ until it is no longer effective. This information could then be used to size a structure for a particular watershed if an estimate of annual dissolved P loads was available.

Experiment 2: Conclusions and Implications

As was shown for large sized steel slag in a previous study (Penn and McGrath, 2011), RT and inflow P concentration can have a significant impact on P sorption onto most by-products under flow-through conditions. This information is especially important in context of using the by-products as P sorbents in landscape P removal structures to remove P from flowing runoff or drainage water. Variation in RT within the range of that tested in this study (0.5 to 10 min) did not have an appreciable impact on cumulative P sorption on most by-products except for three of twelve; this factor was most important for materials that likely remove P via precipitation reactions. Specifically, materials in which precipitation is likely to be the main P removal mechanism (i.e. large WS Ca and well buffered) will be more sensitive to RT and P concentration (increase in RT and P will increase P removal) compared to materials more likely to remove P via ligand exchange reactions (i.e. high oxalate Al and Fe).

Overall, by-products that are elevated in oxalate Al or Fe, WS Ca, and BI will serve as the best P sorbents in P removal structures, and screening for these properties will allow comparison between materials for this potential use. The flow-through approach described in this paper for predicting design curves at specific RT and inflow P combinations will aid a user in prediction of how much P can be removed, and how long a specific material will last until P saturation if the P loading rate for a specific site is known.

General Model

It will be appreciated that the afore-described methods may be used to construct a design model for a P removing system. This model may be used in the design of a P removing system to predict the percentage of phosphorous that can be removed per a given flow rate/retention time, the total amount of phosphorous the system can remove, and thus the lifetime of the system, and other information. However, the model must be experimentally re-evaluated and re-determined for each byproduct (P adsorbing material) that is used. A potentially more useful, general model is also contemplated wherein the factors of the relevant equations may be determined based upon properties that may be measured a priori.

Discrete P removal (%) under flow-through conditions is described as a function of P added (x in equation 1) to the materials (mg P added kg-1 PSM) using the exponential model:

$$\text{Discrete P removal} = be^{mx} \quad (1)$$

Where b is the Y intercept and m is the slope coefficient for this relationship. An example discrete P removal curve was shown in FIG. 5a with P addition units in g kg-1 for greater clarity. Note that since this is an exponential decay equation, m is always negative. Ultimately, the goal of this model is to predict the "b" value and "m" value for a specific P sorbing material. If those two parameters are known and then applied to equation 1, then one can re-create the "design curve" shown in FIG. 5.

However, the "b" and "m" parameters which are specific to a certain material, are a function of the inflow P concentration and retention time ("P" and RT" in equations 4a and 4b). Because the slopes (m in equations 1 and 4a) were not normally distributed, this parameter was log(base 10) transformed (log–slope) before producing the multiple linear regression (MLR) model. Y intercepts (b in equations 1 and 4b) were also log(base 10) transformed.

The results of the MLR models are two equations for predicting the shape (i.e. slope and intercept) of the design curve (equation 1) for each material, which takes the general form:

$$\log(-m) = (\alpha RT) + (\beta P) + \chi \quad (4a)$$

$$\log(b) = (\delta RT) + (\epsilon P) + \mu \quad (4b)$$

Where $\alpha$ and $\beta$ are the design curve slope prediction coefficients for RT and P concentration respectively, $\chi$ is the intercept of the slope prediction equation, $\delta$ and $\epsilon$ are the design curve intercept prediction coefficients for RT and P concentration respectively, and $\mu$ is the intercept of the design curve intercept prediction equation. The P removal curve with predicted parameters is referred to as the "design curve" (FIG. 5).

After a design curve equation is produced (equation 1), integration of it will yield a prediction of cumulative P removal (%) at any given level of P added (x):

$$\text{Cumulative } P \text{ removed} = \frac{\int_0^x (b e^{mx}) dx}{x} \quad (6)$$

An example of an integrated design curve is shown in FIG. 6.

The point at which discrete P removal approaches zero (1%; i.e. "spent") as described by the design curve in equation 1 and FIG. 5 will occur when the P inflow concentration=P outflow concentration and is calculated using the following equation:

$$\text{Maximum } P \text{ added} = \frac{\ln b}{-m} \quad (7)$$

Insertion of the maximum amount of P added determined from equation 7 into the x value for equation 6 will result in the total amount of P predicted to be removed by the material under the conditions (RT and inflow P concentration) employed for the design curve utilized. Using percent cumulative P removed and maximum P added from equations 6 and 7, one can simply estimate the amount of P sorbed (mg kg$^{-1}$) at the point in which the material is spent.

At this point, we can summarize the model as equation 4a and 4b, which predict the "b" and "m" parameters for equation 1, which provides all the information needed for either designing a P removal structure or predicting how long it will last through use of equations 6 and 7.

The heart of this model, as described in following paragraphs, is a prediction of the parameters $\alpha$, $\beta$, $\chi$, $\delta$, $\epsilon$, and $\mu$ shown in equations 4a and 4b. These parameters are predicted as a function of material specific properties. This is what makes the model "universal", so that any P sorbing material can be characterized for the properties described below, and then applied to the model so that a design curve can be produced. Once the design curve is produced, a P removal structure can be designed as well as longevity and performance predicted.

Materials must be characterized for pH, total Ca, Al, and Fe (mg/kg), mean particle size ("PS"; mm), buffer index ("BI"; acid equivalents/kg required to decrease pH to 6.0), and ammonium oxalate extractable Fe and Al ($Fe_{ox}$, $Al_{ox}$; mg/kg).

The first algorithm is to place a material into one of the following categories: Ca based material or Fe/Al material. If a material meets two of the three criteria, then it is categorized as a Ca based material:
1. Total Ca exceeds Total Al+Fe
2. pH>8
3. BI>0.2

If the material does not meet 2 of the 3 criteria, then it is categorized as a Fe/Al based material. At this point there are two different models; one for Ca based materials and another for Fe/Al based materials. The following relations describe the Ca model:

$$\alpha = 0.009113 * PS \quad (8)$$

$$\beta = -(0.00000021 * \text{Total Ca}) + (0.02209 * BI) + (0.01536 * PS) - 0.04258 \quad (9)$$

$$\chi = -0.3795 * LN(BI) - 3.946 \quad (10)$$

$$\delta = (-0.00806 * \mu) + (0.00775 * PS) + 0.02133 \quad (11)$$

$$\epsilon = (0.0191 * pH) - 0.1678 \text{ If } \epsilon > 0, \text{ then set } \epsilon = \text{to } 0 \quad (12)$$

$$\mu = (0.79079 * BI) + 1.51358 \quad (13)$$

For Fe/Al based model:

$$\alpha = (-0.000000733259 * Fe_{ox} + Al_{ox}) + (0.00825 * PS) + 0.03981 \quad (14)$$

$$\beta = (0.00000073793 * Fe_{ox} + Al_{ox}) - 0.04844 \quad (15)$$

$$\chi = (-0.00002078 * Fe_{ox} + Al_{ox}) - 3.00342 \quad (16)$$

$$\delta = (-0.000000974652 * Fe_{ox} + Al_{ox}) + 0.06874 \quad (17)$$

$$\epsilon = (0.000000564354 * Fe_{ox} + Al_{ox}) - 0.0269 \quad (18)$$

$$\mu = (0.0000005159108 * \text{Effective Al+Fe}) + 1.30197 \quad (19)$$

Effective Al+Fe is Total Al+Fe divided by PS.

Figure 8:
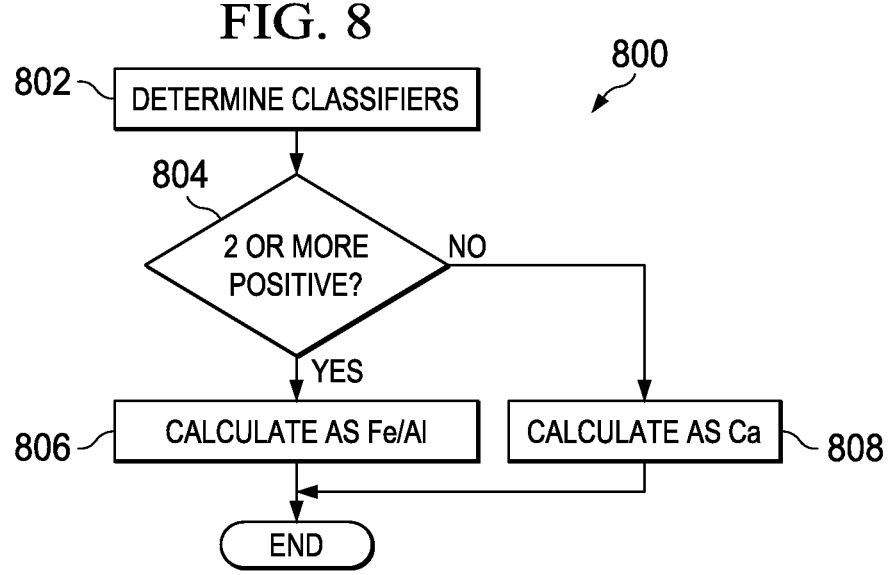
FIG. 8 is a flow chart depicting one method for determining which set of parameter calculations to use for implementing a design curve.

Referring now to FIG. 8, a flowchart 800 illustrates the decision flow for one embodiment. The three classification decisions (e.g., Total Ca exceeds Total Al+Fe; pH>8; and BI>0.2) are determined at step 802. At step 804 if two or more of these classifications are true, the model is calculated as an Fe/Al based model at step 806. If two or more of the classifications are not true, the model is calculated as a Ca model at step 808.

For either model, these parameters can then be inserted into equations 2a and 2b to obtain the b and m values for creating a design curve. For example, a steel slag material categorized as a Ca based material had the following properties:
BI=0.005390
pH=9.4
Total Ca=195331
PS=6.35

Figure 9:
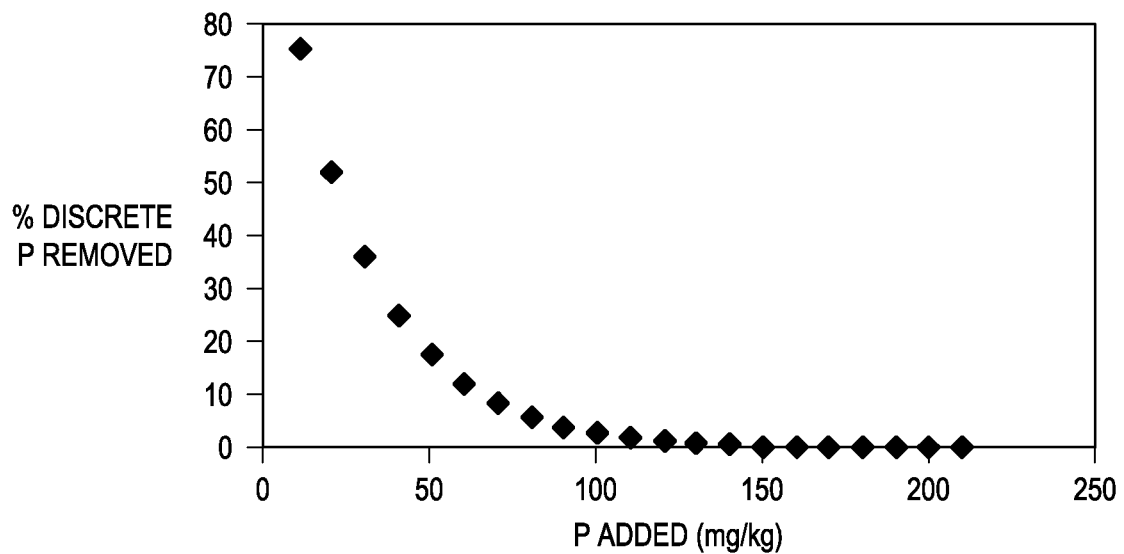
FIG. 9 is a graph of a resulting design curve for steel slag assuming a RT of 8.9 min and an inflow P concentration of 0.74 mg/L. % Discrete P removal=$108.8e^{-0.036445x}$.

The model then produces each of the parameters, $\alpha, \beta, \chi, \delta, \epsilon$, and $\mu$, and then those parameters of inserted into equations 4a and 4b along with a P concentration inflow value ("P") of 0.74 and a retention time (RT) of 8.9 minutes. These are the conditions for a field scale structure constructed at Stillwater Country Club. Then, the resulting b and m values are inserted into equation 1 and plot as the design curve in FIG. 9.

Again, note that this design curve equation is specific to the RT and P conditions input into equations 4a and 4b, and also specific to the material properties measured and input into equations 8 to 12. We can then insert the b and m parameters into equation 7 and obtain the maximum amount of P that can be added to the structure until it is spent (i.e. discrete removal=1% or inflow P concentration~outflow P concentration) to obtain a maximum value of 129 mg P/kg slag. This value is used to predict the longevity of a particular structure, or it can be used to determine how much material is needed. For example, a structure in Stillwater, Okla. contains 3 tons (2721 kg) of this particular steel slag, and the P input to it is 20.5 mg P/kg/month. Based on our maximum P value obtained from equation 7, this structure will remove P for 6.3 months. The total amount of P removed during that time can be estimated by inserting 129 mg/kg into equation 6 along with the determined b and m values; this yields 28.3 mg P removed/kg slag, or in other words, a cumulative removal of 22% all P input over 6.3 months. This prediction was very close to the actual measured performance of the structure (25 mg P removed/kg slag and 25% cumulative removal).

Figure 10:
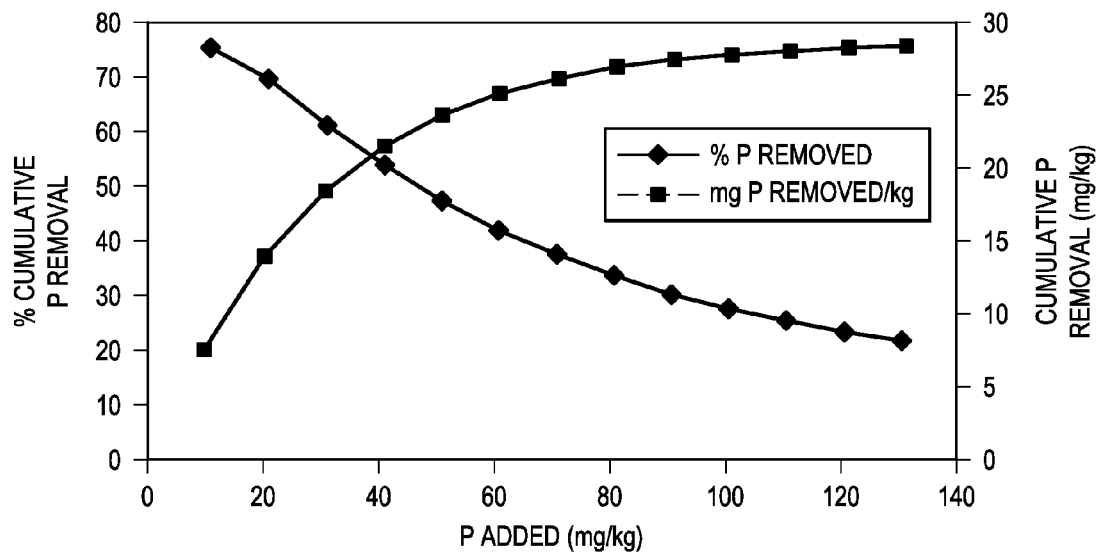
FIG. 10 is a graph of the integration of the curve of FIG. 9.

Continuing with the same example, integration of the design curve equation produces FIG. 10.

Using the information in FIG. 10 and assuming use of the same steel slag material, we determine the necessary size of a structure based on a target cumulative P removal. For example assume that our target cumulative P removal after 1 year of service is 50%. Knowing that our P loading at our particular site is 167 g P/month, one can calculate that the necessary slag needed to remove 50% of 1 yr P delivery is 22,266 kg of steel slag, or 24.5 tons. Please note that this calculation is assuming that the structure is designed to possess a RT of 8.9 minutes.

This model was produced by conducting hundreds of flow-through experiments in the laboratory using various P inflow concentrations and RTs. Treated water was sampled every 30 minutes. 16 different P sorbing materials were tested and characterized. Essentially, a the model was constructed to relate the flow-through experiment performance to material properties.

Figure 11:
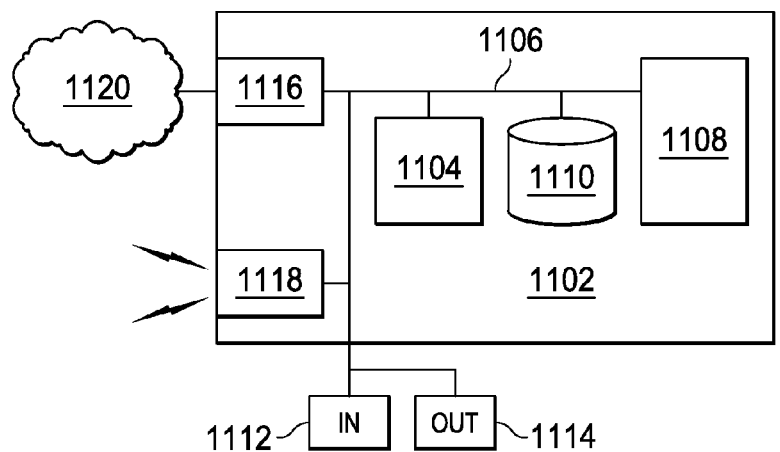
FIG. 11 is a schematic diagram of a computer system implementing methods of the present disclosure.

It is understood that the calculation methods described herein may be programmed to be performed on a general-purpose computer. Some portable devices and smart phones may be capable of carrying out the calculation as well. In one embodiment the computer will be a workstation. With reference to FIG. 11, the workstation may comprise an enclosure 1102 containing various internal components. A processor 1104 may be connected by a data bus 1106 (or a plurality of data buses) to an electronic memory that stores instructions for execution by the processor 1104. A mass storage device 1110 may also be attached for storing instructions and data in a non-volatile format. The workstation may have an input device 1112 such as a mouse and/or keyboard. An output device 1114 such as a monitor and/or printer may be attached. In some cases, the computer 1100 will have an Ethernet connection 1116 and or a wireless card 1118 for accessing a network 1112 such as a local area network or the internet. Moreover, software packages exist that can be easily configured to calculate the required coefficients. Design models and curves may be plotted visually (see, e.g., FIGS. 6-7) if so desired. Hence, devices capable of realizing the methods and systems of the present disclosure may be produced by one having ordinary skill in the art.

TABLE 1

Characterization of the normal and treated slag.

| Material | pH | Alkalinity | Total[†] | | | | | Water soluble | | | | | Crystalline minerals[‡] |
| | | | Ca | Mg | S | Fe | Al | Ca | Mg | S | Fe | Al | |
| --- | --- | --- | --- | --- | --- | --- | --- | --- | --- | --- | --- | --- | --- |
| Normal | 10.9 | 766 | 256382 | 79043 | 6208 | 191776 | 32923 | 249 | 0.71 | 82 | 0 | 15 | Portlandite, Calcite, Calcium silicate |
| Treated | 7.1 | 156 | 270023 | 72344 | 17771 | 152145 | 41100 | 5818 | 76 | 4654 | 0 | 2.5 | Calcite, gypsum |

[†]Determined by EPA3051 digestion method
[‡]Determined by X-ray diffraction

TABLE 2

Long-term phosphorus (P) removal performance of the materials tested on a pond. Actual P removal compared to predicted removal using flow-through equations (equation X) and Langmuir isotherm.

| Parameter | | Normal slag | Treated slag |
| --- | --- | --- | --- |
| Duration tested | (days) | 20 | 20 |
| P Input Range | (mg L$^{-1}$) | 0.11 to 0.60 | 0.16 to 0.52 |
| Flow weighted concentration | (mg L$^{-1}$) | 0.38 | 0.34 |
| Total P added | (mg kg$^{-1}$) | 172 | 149 |
| Mass material | (kg) | 454 | 454 |
| Retention time | (min) | 10 | 10 |
| Measured P removed | (mg kg$^{-1}$) | 59 | 54 |
| Flow-through predicted P removed | (mg kg$^{-1}$) | 88 | 62 |
| Langmuir isotherm predicted P removed | (mg kg$^{-1}$) | 316 | 15.9 |

TABLE 3

Properties of by-products used in the flow-through phosphorus sorption experiments. Average of three replicates.

| Material | Total Ca | Total Mg | Total Al | Total Fe | Oxalate Al g kg$^{-1}$ | Oxalate Fe | Water soluble Ca | Water soluble Mg | BI[†] Eq kg$^{-1}$ | pH | $S_{max}$[‡] g kg$^{-1}$ | K[§] | Crystalline minerals |
|---|---|---|---|---|---|---|---|---|---|---|---|---|---|
| AMDR1[¶] | 0.2 | 0.1 | 2.0 | 455 | 0.1 | 26 | 0.09 | 0.2 | 0 | 3.2 | 26 | 0.00035 | Goethite |
| AMDR2 | 23 | 1.6 | 98 | 189 | 47 | 30 | 6.7 | 0.04 | 0.21 | 7.1 | 54 | 0.039 | Hematite, Gypsum |
| AMDR3 | 8.3 | 1.2 | 9.3 | 338 | 0.4 | 40 | 3.7 | 0.02 | 0.01 | 6.4 | 23 | 0.00053 | Goethite |
| AMDR4 | 204 | 35 | 17 | 118 | 5.4 | 33 | 0.7 | 2.1 | 1.8 | 8.4 | 157 | 0.00009 | Calcite |
| Slag fines | 272 | 90 | 37 | 155 | 0.9 | 4.4 | 0.6 | .001 | 0.68 | 11.3 | 29 | 0.012 | Portlandite |
| Fly-ash1 | 151 | 26 | 87 | 42 | 27 | 8.6 | 1.1 | 0.008 | 0.64 | 11.4 | 21 | 0.012 | Quartz |
| Fly-ash2 | 153 | 28 | 65 | 37 | 29 | 10 | 1.0 | 0.009 | 0.94 | 11.4 | 27 | 0.0062 | Quartz |
| FGD[#] gypsum | 209 | 1.5 | 0.8 | 1.8 | 0.06 | 0.6 | 6.5 | 0.04 | 0.03 | 8.1 | 45 | 0.00021 | Gypsum |
| Ca-WTR[††] | 286 | 19 | 14 | 7.2 | 5.2 | 1.0 | 0.8 | 2.2 | 0.93 | 8.9 | 29 | 0.0017 | Calcite |
| Al-WTR1 | 3.3 | 1.6 | 157 | 17 | 58 | 2.5 | 0.4 | 0.02 | 0.03 | 7.3 | 58 | 0.018 | Quartz |
| Al-WTR2 | 19 | 1.9 | 81 | 15 | 37 | 2.1 | 2.2 | 0.03 | 0.06 | 7.3 | 30 | 0.015 | Quartz |
| Excell Minerals | 268 | 62 | 20 | 71 | 2.3 | 19 | 0.2 | 0.002 | 2.3 | 10.9 | 32 | 0.019 | Tri-calcium magnesium orthosilicate |

[†]Buffer index; equivalents of acid kg$^{-1}$ required to decrease pH to 6.0
[‡]Phosphorus sorption maximum as estimated by Langmuir model
[§]Langmuir sorption coefficient
[¶]Acid mine drainage residual
[#]Flue gas desulfurization gypsum
[††]Water treatment residual

TABLE 4

Model coefficients from equation 2a for predicting slope (m) of the design curve for each by-product as a function of flow-through retention time and phosphorus (P) concentrations. Slope values are log transformed (log -slope).

| | Retention time | | P concentration | | Intercept | | Overall Model |
|---|---|---|---|---|---|---|---|
| Material | α | p value | β | p value | χ | p value | p value |
| AMDR1[†] | 0.01838 | 0.0195 | −0.01443 | 0.0034 | −3.9627 | <0.0001 | 0.0013 (0.25)[¶] |
| AMDR2 | −0.01143 | 0.1087 | −0.00315 | 0.4682 | −4.2162 | <0.0001 | 0.2118 (0.06) |
| AMDR3 | 0.05033 | 0.01 | 0.01646 | 0.1528 | −4.37742 | <0.0001 | 0.0051 (0.23) |
| AMDR4 | 0.04191 | <0.0001 | −0.02003 | <.0001 | −4.12699 | <0.0001 | <0.0001 (0.52) |
| Slag fines | 0.00174 | 0.9243 | −0.09297 | 0.0001 | −3.24951 | <0.0001 | <0.0001 (0.60) |
| Fly-ash1 | 0.01703 | 0.3288 | −0.02851 | 0.0122 | −3.80047 | <0.0001 | 0.0252 (0.15) |
| Fly-ash2 | −0.0104 | 0.6741 | −0.02546 | 0.087 | −3.77582 | <0.0001 | 0.2215 (0.06) |
| FGD[‡] gypsum | −0.07616 | <0.0001 | −0.05743 | <0.0001 | −1.1482 | <0.0001 | <0.0001 (0.73) |
| Ca-WTR[§] | 0.000208 | 0.9907 | 0.02585 | 0.0228 | −4.24064 | <0.0001 | 0.0722 (0.11) |
| Al-WTR1 | −0.00764 | 0.503 | −0.01881 | 0.0107 | −4.12499 | <0.0001 | 0.0297 (0.15) |
| Al-WTR2 | 0.04167 | 0.0052 | −0.01725 | 0.0549 | −3.70686 | <0.0001 | 0.004 (0.21) |
| Excell Minerals | 0.04811 | 0.0133 | −0.03181 | 0.0088 | −4.48647 | <0.0001 | 0.0021 (0.23) |

[†]Acid mine drainage residual
[‡]Flue gas desulfurization gypsum
[§]Water treatment residual
[¶]$R^2$ value

TABLE 5

Model coefficients from equation 2b for predicting the Y intercept (b) of the design curve for each by-product as a function of flow-through retention time and phosphorus (P) concentrations. Y intercept values are log transformed.

| Material | Retention time δ | p value | P concentration ε | p value | Intercept μ | p value | Overall Model p value |
|---|---|---|---|---|---|---|---|
| AMDR1[†] | 0.03045 | <0.0001 | −0.00974 | 0.0009 | 1.61596 | <0.0001 | <0.0001 (0.56)[¶] |
| AMDR2 | −0.00905 | 0.0599 | 0.01453 | <0.0001 | 1.75964 | <0.0001 | <0.0001 (0.38) |
| AMDR3 | 0.04451 | <0.0001 | 0.01079 | 0.0409 | 1.04106 | <0.0001 | <0.0001 (0.51) |
| AMDR4 | 0.04247 | <0.0001 | −0.01485 | 0.0025 | 1.36396 | <0.0001 | <0.0001 (0.47) |
| Slag fines | 0.00542 | 0.1795 | 0.00283 | 0.2556 | 1.96974 | <0.0001 | 0.1988 (0.06) |
| Fly-ash1 | 0.00726 | 0.4187 | −0.01478 | 0.0119 | 1.96512 | <0.0001 | 0.0284 (0.15) |
| Fly-ash2 | −0.01149 | 0.231 | −0.00502 | 0.3752 | 2.00253 | <0.0001 | 0.3637 (0.05) |
| FGD[‡] gypsum | −0.02957 | 0.0001 | −0.00028579 | 0.941 | 2.13484 | <0.0001 | 0.0004 (0.32) |
| Ca-WTR[§] | −0.01832 | <0.0001 | 0.00086459 | 0.7394 | 1.87339 | <0.0001 | 0.004 (0.30) |
| Al-WTR1 | −0.00314 | 0.6561 | −0.00644 | 0.1479 | 1.4957 | <0.0001 | 0.3117 (0.05) |
| Al-WTR2 | 0.03853 | <0.0001 | 0.01352 | 0.0024 | 1.1708 | <0.0001 | <0.0001 (0.47) |
| Excell Minerals | 0.0009471 | 0.8948 | −0.00254 | 0.569 | 1.82605 | <0.0001 | 0.8416 (0.01) |

[†]Acid mine drainage residual
[‡]Flue gas desulfurization gypsum
[§]Water treatment residual
[¶]$R^2$ value

TABLE 6

By-product properties found to be most influential on the design curve model coefficients (equations 2a and 2b) listed in Tables 2 and 3 as determined by the SAS "stepwise" procedure.

| Variable | Coefficient | Partial $R^2$ | Model $R^2$ | p Value |
|---|---|---|---|---|
| α | | | | |
| Water soluble Ca | −9.4E−06 | 0.29 | 0.29 | 0.072 |
| Oxalate Fe | 1.4E−06 | 0.33 | 0.62 | 0.022 |
| β | | | | |
| Total Mg | −6.86E−07 | 0.4 | 0.40 | 0.029 |
| Water soluble Mg | 1.74E−05 | 0.21 | 0.61 | 0.056 |
| χ | | | | |
| Oxalate Fe | −4.27E−05 | 0.31 | 0.55 | 0.033 |
| Oxalate Al | −1.92E−05 | 0.19 | 0.64 | 0.042 |
| δ | | | | |
| Oxalate Fe | 1.00E−06 | 0.33 | 0.33 | 0.049 |
| ε | | | | |
| Water soluble Ca | 2.48E−06 | 0.34 | 0.34 | 0.046 |
| μ | | | | |
| BI[†] | 1.15 | 0.48 | 0.48 | 0.012 |
| Water soluble Mg | −6.42E−04 | 0.25 | 0.73 | 0.018 |

[†]Buffer index; equivalents of acid kg$^{-1}$ required to decrease pH to 6.0

REFERENCES

Carpenter, S. R., 2008. Phosphorus control is critical to mitigating eutrophication. Proc. Natl. Acad. Sci. USA 105: 11039-11040.

Cao, X., and W. Harris. 2007. Carbonate and magnesium interactive effect on calcium phosphate precipitation. Environ. Sci. Technol. 42:436-442.

Cucarella, V., and G. Renman. 2009. Phosphorus sorption capacity of filter materials used for on-site wastewater treatment determined in batch experiments—A comparative study. J. Environ. Qual. 38:381-392.

DeSutter, T. M., G. M. Pierzynski, and L. Baker. 2006. Flow-through and batch methods for determining Ca—Mg and Mg—Ca selectivity. Soil Sci. Soc. Am. J. 70:550-554.

Dobbie, K. E., K. V. Heal, J. Aumonier, K. A. Smith, A. Johnston, and P. L. Younger. 2009. Evaluation of iron ochre from mine drainage treatment for removal of phosphorus from wastewater. Chemosphere 75: 795-800.

Edwards, D. R., and T. C. Daniel. 1993. Effects of poultry litter application rate and rainfall intensity on quality of runoff from fescue grass plots. J. Environ. Qual. 22:361-365.

Elliott, H. A., R. C. Brandt, and G. A. O'Connor. 2005. Runoff phosphorus losses from surface-applied biosolids. J. Environ. Qual. 34:1632-1639.

Essington, M. L. 2004. Soil and water chemistry: an integrative approach. CRC Press, Boca Raton, Fla.

Fenton, O., M. G. Healy, and M. Rodgers. 2009. Use of ochre from an abandoned metal mine in the south east of Ireland for phosphorus sequestration from dairy dirty water. J. Environ. Qual. 38: 1120-1125.

Heal, K. V., K. E. Dobbie, E. Bozika, H. McHaffie, A. E. Simpson, and K. A. Smith. 2005. Enhancing phosphorus removal in constructed wetlands with ochre from mine drainage treatment. Water Sci. Tech. 51: 275-282.

Hedin, R. S., G. R. Watzlaf, and R. W. Nairn. 1994. Passive treatment of acid-mine drainage with limestone. J. Environ. Qual. 23:1338-1345.

Ippolito, J. A., K. A. Barbarick, and H. A. Elliott. 2011. Drinking water treatment residuals: A review of recent uses. J. Environ. Qual. 40:1-12.

Johansson, L. 1999. Industrial by-products and natural substrata as phosphorus sorbents. Environ. Tech. 20:309-316.

Johansson Westholm, L. 2006. Substrates for phosphorus removal—Potential benefits for on-site wastewater treatment? Water Res. 40:23-26.

Kleinman, P. J. A., A. N. Sharpley, A. M. Wolf, D. B. Beegle, and P. A. Moore, Jr. 2002. Measuring water extractable phosphorus in manure as an indicator of phosphorus in runoff. Soil Sci. Soc. Am. J. 66:2009-2015.

Leader, J. W., E. J. Dunne, and K. R. Reddy. 2008. Phosphorus sorbing materials: sorption dynamics and physicochemical characteristics. J. Environ. Qual. 37:174-181.

Lindsay, W. L. 1979. Chemical equilibria in soils. John Wiley and Sons, New York.

McDowell, R. W., A. N. Sharpley, and W. Bourke. 2008. Treatment of drainage water with industrial by-products to prevent phosphorus loss from tile-drained land. J. Environ. Qual. 37:1575-1582.

McKeague, J., and J. H. Day. 1966. Dithionite and oxalate-extractable Fe and Al as aids in differentiating various classes of soils. Can. J. Soil Sci. 46:13-22.

Murphy, J., and J. R. Riley. 1962. A modified single solution method for the determination of phosphate in natural waters. Anal. Chim. Acta 27:31-36.

Penn, C. J., and R. Bryant. 2006. Application of phosphorus sorbing materials to streamside cattle loafing areas. J. Soil Water Cons. 61:303-310.

Penn, C. J., R. B. Bryant, P. A. Kleinman, and A. L. Allen. 2007. Removing dissolved phosphorus from ditch drainage water with phosphorus sorbing materials. J. Soil Water Conserv. 62:269-276.

Penn, C. J., J. M. McGrath, and R. B. Bryant. 2010. Ditch drainage management for water quality improvement. p. 151-173. In M. T. Moore and R. Kroger (ed.). Agricultural drainage ditches: mitigation wetlands for the 21st century. Research Signpost. Kerala, India. ISBN 978-81-308-0376-0.

Penn, C. J. and J. M. McGrath. 2011. Predicting phosphorus sorption onto steel slag using a flow-through approach with application to a pilot scale system. J. Water Res. Protec. 3:235-244.

Penn, C. J., J. M. McGrath, E. Rounds, G. Fox, and D. Heren. 2011a. Trapping phosphorus in runoff with a phosphorus removal structure. J. Environ. Qual. In review (Submitted Feb. 15, 2011).

Penn, C. J., R. B. Bryant, M. A. Callahan, and J. M. McGrath. 2011b. Use of industrial by-products to sorb and retain phosphorus. Commun. Soil Sci. Plant Anal. 42:633-644.

Sharpley, A. N., S. J. Smith, O. R. Jones, W. A. Berg, and G. A. Coleman. 1992. The transport of bioavailable phosphorus in agricultural runoff. J. Environ. Qual. 21:30-35.

Sharpley, A. N., P. J. A. Kleinman, R. W. McDowell, M. Gitau, and R. B. Bryant. 2002. Modeling phosphorus transport in agricultural watersheds: Processes and possibilities. J. Soil Water Conserv. 57:425-439.

Shilton, A. N., I. Elmetri, A. Drizo, S. Pratt, R. G. Haverkamp, and S. C. Bilby. 2006. Phosphorus removal by an "active" slag filter—a decade of full scale experience. Water Res. 40:113-118

Sibrell, P. L., G. A. Montgomery, K. L. Ritenour, and T. W. Tucker. 2009. Removal of phosphorus from agricultural wastewaters using adsorption media prepared from acid mine drainage sludge. Water Res. 43:2240-50

Sonzogni W. C., S. G. Chapra, D. E. Armstrong, and L. T. Logan. 1982. Bioavailability of phosphorus inputs to lakes. J. Environ. Qual. 11:555-563.

U. S. Environmental Protection Agency. 1997. Method 3051a: Micro-wave assisted acid dissolution of sediments, sludges, soils, and oils. $2^{nd}$ ed. U. S. Gov. Print. Office, Washington, D.C.

Vadas, P. A., R. D. Harmel, and P. J. A. Kleinman. 2007. Transformations of soil and manure phosphorus after surface application of manure to field plots. Nutr. Cycl. Agroecosyst. 77:83-99.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A method of constructing a phosphorous adsorbing structure comprising:
   creating a design model that indicates a percentage of phosphorous removed from a water supply per an amount of a predetermined adsorbent exposed to the water supply based upon an original concentration of phosphorous in the water supply and a retention time of water in the adsorbing structure;
   selecting a percentage value from the design model for a target amount of phosphorous to be removed from the water supply; and
   constructing a cell containing an amount of the predetermined adsorbent as required by the design model and having the required retention time.

2. The method of claim 1, further comprising creating the design model based upon a plurality of experimentally derived data points indicating percentages of phosphorous removed per quantity of exposed adsorbent at a plurality of retention times and original phosphorous concentrations.

3. The method of claim 2, wherein the design model is based upon a function of phosphorous adsorbed by the adsorbent governed by the equation $P=be^{mx}$, where P is discrete phosphorous adsorbed, x is the phosphorous added to the adsorbent, b is the Y-intercept and m is the slope.

4. The method of claim 3, further comprising determining a total amount of phosphorous removed by the structure using the relationship $$\text{Cumulative } P \text{ removed } (\%) = \frac{\int_0^x (be^{-mx}) dx}{x}.$$

5. The method of claim 4, further comprising determining a maximum phosphorous adsorbed by the structure using the relationship $$\text{Maximum } P \text{ added} = \frac{\ln b}{-m}.$$

6. The method of claim 2, wherein m and b are determined experimentally from linear regression of the plurality of experimentally derived data points.

7. The method of claim 1, wherein:
   the adsorbent is Ca based;

the design model is based upon the equation $P=be^{mx}$, with P being discrete phosphorous removed, and x being phosphorous added to the adsorbent;

m is determined based on the equation: $\log(-m)=(\alpha RT)+(\beta P)+\chi$;

b is determined based on the equation: $\log(b)=(\delta RT)+(\epsilon P)+\mu$;

$\alpha=0.009113*PS$;

$\beta=-(0.00000021*\text{Total Ca})+(0.02209*BI)+(0.01536*PS)-0.04258$;

$\chi=-0.3795*LN(BI)-3.946$;

$\delta=(-0.00806*\mu)+(0.00775*PS)+0.02133$;

$\epsilon=$ the lesser of zero and $(0.0191*pH)-0.1678$;

$\mu=(0.79079*BI)+1.51358$ with PS=byproduct mean particle size, BI=acid equivalent to decrease pH to about 6.0.

8. A method of rejuvenating a contaminant phosphorous adsorber comprising:
retaining the contaminant phosphorous adsorber in a cell; and
precipitating amorphous Al hydroxide minerals on the surface of the phosphorous adsorber.

9. The method of claim 8, wherein the phosphorous adsorber is a slag material.

10. The method of claim 8, wherein the phosphorous adsorber is a steel slag.

11. The method of claim 8, wherein the phosphorous adsorber is an industrial byproduct.

12. The method of claim 8, further comprising plugging the cell to prevent draining prior to precipitating amorphous Al hydroxide minerals on the surface of the phosphorous adsorber.

13. The method of claim 8, further comprising leaving the Al hydroxide minerals on the surface of the phosphorous adsorber for about 48 hours.

14. The method of claim 8, wherein precipitating amorphous Al hydroxide minerals on the surface of the phosphorous adsorber further comprises precipitating aluminum sulfate solution $(Al_2[SO_4]_3 \cdot 12H_2O)$ onto the adsorber.

\* \* \* \* \*

UNITED STATES PATENT AND TRADEMARK OFFICE
CERTIFICATE OF CORRECTION

PATENT NO. : 8,754,004 B2
APPLICATION NO. : 13/447956
DATED : June 17, 2014
INVENTOR(S) : Penn It is certified that error appears in the above-identified patent and that said Letters Patent is hereby corrected as shown below:

On the title page, under abstract "14 Claims, 13 Drawing Sheets" should read -- 15 Claims, 13 Drawing Sheets --.

In the Claims

Column 29, line 17, Claims 1-8 and 12-18 were allowed and renumbered claims 1-15. However, only 14 claims are printed in the issued patent. Claim 8 was not included in the issued patent. Claim 8 is printed out below and should be included in the claims of the Letters Patent.

8. The method of claim 1, wherein:
the byproduct is Al and Fe based;
the design model is based upon the equation $P = be^{mx}$, with P being discrete phosphorous removed, and x being phosphorous added to the adsorbent;
m is determined based on the equation: $\log(-m) = (\alpha RT) + (\beta P) + \chi$;
b is determined based on the equation: $\log(b) = (\delta RT) + (\varepsilon P) + \mu$;
$\alpha = (-0.000000733259*Feox+Alox)+(0.00825*PS) +0.03981$;
$\beta = (0.00000073793* Feox+Alox)-0.04844$;
$\chi = (-0.00002078* Feox+Alox)-3.00342$;
$\delta = (-0.000000974652* Feox+Alox)+0.06874$;
$\varepsilon = (0.000000564354* Feox+Alox)-0.0269$;
$\mu = (0.0000005159108*Effective Al+Fe)+1.30197$; and
Effective Al+Fe is Total Al+Fe divided by PS;
with PS = byproduct mean particle size, Feox = oxalate extractable Fe of the byproduct, and Alox = oxalate extractable Al of the byproduct.

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,754,004 B2                                              Page 1 of 1
APPLICATION NO.   : 13/447956
DATED             : June 17, 2014
INVENTOR(S)       : Penn It is certified that error appears in the above-identified patent and that said Letters Patent is hereby corrected as shown below:

In the specification

Column 1, lines 5-11, the paragraph entitled STATEMENT REGARDING FEDERALLY SPONSORED RESEARCH OR DEVELOPMENT needs to be deleted in its entirety.

Signed and Sealed this
Fifteenth Day of March, 2016

Michelle K. Lee
*Director of the United States Patent and Trademark Office*